United States Patent
Mayfield et al.

(10) Patent No.: US 11,205,989 B2
(45) Date of Patent: Dec. 21, 2021

(54) REPLACEMENT TILE MOUNT FOR MOUNTING SOLAR PANELS ON TILE ROOFS

(71) Applicant: Unirac Inc., Albuquerque, NM (US)

(72) Inventors: Jason Mayfield, Albuquerque, NM (US); Nathan Schuit, Edgewood, NM (US); Stacy Harris, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 82 days.

(21) Appl. No.: 16/827,300

(22) Filed: Mar. 23, 2020

(65) Prior Publication Data

US 2020/0228051 A1   Jul. 16, 2020

Related U.S. Application Data

(62) Division of application No. 15/699,637, filed on Sep. 8, 2017, now Pat. No. 10,601,360.

(51) Int. Cl.
| | |
|---|---|
| *H02S 20/23* | (2014.01) |
| *F24S 25/10* | (2018.01) |
| *F24S 25/636* | (2018.01) |
| *F24S 25/61* | (2018.01) |
| *F24S 25/60* | (2018.01) |

(52) U.S. Cl.
CPC ............. *H02S 20/23* (2014.12); *F24S 25/10* (2018.05); *F24S 25/61* (2018.05); *F24S 25/636* (2018.05); *F24S 2025/6006* (2018.05)

(58) Field of Classification Search
CPC ......... H02S 20/23; F24S 25/636; F24S 25/61; F24S 25/10; F24S 2025/6006
See application file for complete search history.

(56) References Cited

U.S. PATENT DOCUMENTS

| | | |
|---|---|---|
| 5,082,412 A | 1/1992 | Thomas |
| 6,526,701 B2 | 3/2003 | Stearns et al. |
| 8,146,299 B2 | 4/2012 | Stearns et al. |
| 8,151,522 B2 | 4/2012 | Stearns et al. |
| 8,153,700 B2 | 4/2012 | Stearns et al. |
| 8,166,713 B2 | 5/2012 | Stearns et al. |
| 8,181,398 B2 | 5/2012 | Stearns et al. |
| 8,209,914 B2 | 7/2012 | Stearns et al. |
| 8,225,557 B2 | 7/2012 | Stearns et al. |
| 8,245,454 B2 | 8/2012 | Stearns et al. |

(Continued)

OTHER PUBLICATIONS

Office Action for U.S. Appl. No. 15/699,637, dated Jun. 19, 2019, Mayfield, "Replacement Tile Mount for Mounting Solar Panels on Tile Roofs", 12 pages.

*Primary Examiner* — Babajide A Demuren
(74) *Attorney, Agent, or Firm* — Lee & Hayes, P.C.

(57) ABSTRACT

A one-piece, monolithic tile support mount attaches to a roof and provides rigid structural support for a lateral attachment bar or L-foot that is used to hold a height-adjustable mounting mechanism or mounting rail, which is used to attach solar photovoltaic panels to the roof of a roof covered with roofing tiles. A custom-designed, sheet-metal or polymer, aperture-less replacement tile is mounted between the lateral attachment bar or the L-foot and the tile support mount. Also provided is a compact, magnetic positioning tool that provides proper alignment of a drill bit when drilling or punching holes through the replacement tile.

20 Claims, 40 Drawing Sheets

(56) References Cited

U.S. PATENT DOCUMENTS

| | | |
|---|---|---|
| 8,250,829 B2 | 8/2012 | McPheeters et al. |
| 8,272,174 B2 | 9/2012 | Stearns et al. |
| 8,328,159 B2 | 12/2012 | Lee |
| 8,413,388 B2 | 4/2013 | Stearns et al. |
| 8,539,719 B2 | 9/2013 | McPheeters et al. |
| 8,683,751 B2 | 4/2014 | Stearns |
| 8,701,354 B2 | 4/2014 | Stearns et al. |
| 8,739,471 B2 | 6/2014 | McPheeters et al. |
| 8,782,983 B2 | 7/2014 | Stearns |
| 8,826,618 B2 | 9/2014 | Stearns |
| 8,910,448 B2 | 12/2014 | Okada et al. |
| 9,010,038 B1 | 4/2015 | Stearns et al. |
| 9,127,464 B2 | 9/2015 | Stearns et al. |
| 9,134,044 B2 | 9/2015 | Stearns et al. |
| 9,151,315 B2 | 10/2015 | McPheeters |
| 9,175,478 B2 | 11/2015 | Stearns et al. |
| 9,212,833 B2 | 12/2015 | Stearns et al. |
| 9,422,723 B2 | 8/2016 | Stearns et al. |
| 9,431,953 B2 | 8/2016 | Stearns et al. |
| 9,447,988 B2 | 9/2016 | Stearns et al. |
| 9,853,595 B1 | 12/2017 | Okado |
| 10,151,114 B2 | 12/2018 | Stearns et al. |
| 10,211,775 B1 | 2/2019 | Wentworth et al. |
| 10,243,506 B2 | 3/2019 | Robinson |
| 2003/0121220 A1 | 7/2003 | Bradley, Jr. |
| 2009/0256100 A1 | 10/2009 | Lee |
| 2010/0088996 A1* | 4/2010 | Thompson ............ H02S 20/23 52/704 |
| 2010/0307074 A1 | 12/2010 | Stearns et al. |
| 2011/0204195 A1 | 8/2011 | Stanley |
| 2012/0031019 A1 | 2/2012 | Stearns et al. |
| 2012/0037528 A1 | 2/2012 | Schutz |
| 2014/0175244 A1 | 6/2014 | West et al. |
| 2014/0245592 A1 | 9/2014 | Burkhart et al. |
| 2015/0288320 A1 | 10/2015 | Stearns et al. |
| 2016/0025262 A1 | 1/2016 | Stearns et al. |
| 2016/0126884 A1 | 5/2016 | Stearns et al. |
| 2016/0138269 A1 | 5/2016 | Stearns et al. |
| 2016/0226432 A1 | 8/2016 | Almy et al. |
| 2016/0268965 A1 | 9/2016 | Stearns et al. |
| 2016/0344332 A1 | 11/2016 | Stearns et al. |
| 2016/0344333 A1 | 11/2016 | Stearns et al. |
| 2016/0352283 A1 | 12/2016 | Stearns et al. |
| 2016/0359446 A1 | 12/2016 | Molina et al. |
| 2017/0067258 A1 | 3/2017 | Stearns et al. |
| 2017/0107723 A1 | 4/2017 | Stearns et al. |
| 2018/0209693 A1 | 7/2018 | Parkinson et al. |
| 2019/0081587 A1 | 3/2019 | Mayfield et al. |

\* cited by examiner

Sec. B-B

Sec. D-D

DETAIL 'A'

REPLACEMENT TILE MOUNT FOR MOUNTING SOLAR PANELS ON TILE ROOFS

RELATED APPLICATIONS

This application claims priority to and is a divisional of U.S. patent application Ser. No. 15/699,637, filed on Sep. 8, 2017, the entire contents of which are incorporated herein by reference.

BACKGROUND OF THE INVENTION

Field of the Invention

This invention pertains to structures and methods for mounting photovoltaic solar panels on roofs, and in particular to either rail based or rail-less solar panel mounting structures on a roof covered with roofing tiles.

Introduction and Related Art

Solar panel mounting structures for tiled roofs are well known. Typically, mounting such a structure involves removing a roofing tile, installing the mounting structure, and installing a replacement tile that is modified to cooperate with the solar mounting structure. An important aspect of such an installation is making it easy to install and making it waterproof. As the installation costs of solar panels on residential homes continues to go down, one way to reduce cost is to make it easier and faster to install mounting components on the roof.

U.S. Pat. No. 9,151,315 to McPheeters et al., "Devices, Systems and Methods for Securing a Component to a Surface", describes a fastening device comprising: a base member comprising a base plate and a threaded projection extending from the base plate; a capping nut comprising a threaded bore configured to threadably engage the threaded projection, and a nut aperture; and a base sealing gasket disposed on the base plate.

U.S. Pat. No. 8,910,448 to Okada et al. discloses a roof-installed solar cell module securing device capable of suppressing action of the weight of the module on a roof structural member.

U.S. Pat. No. 8,739,471 to McPheeters et al., "Assembly for Securing a Component to a Roof", describes a base comprising: a base aperture; a securing component laterally separated from the base aperture; and a lag bolt extending through the base aperture to secure the base to the roof; and a flashing positioned over the base, comprising: a flashing component comprising a raised portion positioned over the base, and an enclosed flashing aperture in the raised portion receiving the securing component.

U.S. Pat. No. 8,539,719 to McPheeters et al., "Module Attachment Apparatus", comprises an assembly for securing a component to a roof, comprising: a base secured to the roof, comprising: an aperture receiving a fastener for securing the base to the roof; and a securing component extending from the base away from the roof, wherein the securing component is laterally separated from the aperture; a flashing installed over the base, the flashing comprising: a rectangular portion extending toward a higher elevated side of the roof, and installed under a shake, a shingle, a slate, or a tile; and a flashing component configured to fully cover the base; and a support secured to the securing component of the base, which extends from the base and through the flashing, wherein the support is configured to secure a module and a rail.

U.S. Pat. No. 8,250,829 to McPheeters et al., "Module Attachment Apparatus", comprises an assembly for securing a component to a roof, comprising: a rail comprising: a first component comprising: a first rail flange; a first recess proximal to the first rail flange; a first bump proximal to the first recess; and a second component comprising: a second rail flange; a second recess proximal to the first rail flange; a second bump proximal to the first recess; and a first nut comprising: a first aperture for receiving a first bolt; a first nut flange configured to engage the first recess on the first component of the rail, and: a second nut flange configured to engage the second recess on the second component of the rail.

Vermont Slate and Copper Services/Rillito River (Eco-Fasten, Inc.), has a large family of patents related to a roofing grommet forming a seal between a roof-mounted structure and a roof, among other things. These patents include: U.S. Pat. Nos. 8,782,983; 8,826,618; 9,212,833; 6,526,701; 9,010,038; 9,175,478; 8,413,388; 9,127,464; 8,151,522; 8,166,713; 8,146,299; 8,181,398; 8,701,354; 8,225,557; 8,272,174; 8,245,454; 8,209,914; 9,134,044; 8,153,700; 8,683,751; 8,782,983; 8,826,618; 9,175,478; 6,526,701; 9,422,723; 9,431,953; 9,447,988; 2016/0344332; 2016/0344333; 2016/0352283; 2016/0268965; 2016/0025262; 2016/0126884; 2015/0288320; 2016/0138269; 2017/0107723; and 2017/0067258.

Against this background, the present invention was developed.

SUMMARY OF THE INVENTION

A one-piece, monolithic tile support mount attaches to a roof and provides rigid structural support for a lateral attachment bar (or L-foot) that is used to hold a height-adjustable mounting mechanism, which is used to attach solar photovoltaic panels to the roof of a roof covered with roofing tiles. A custom-designed, sheet-metal or polymer aperture-less replacement tile is mounted in-between the lateral attachment bar (or L-foot) and the tile support mount. Also provided is a means for producing an aperture in the replacement tile comprising a compact, magnetic positioning tool tactile based aperture location that provides proper alignment of a drill bit when drilling or punching holes through the replacement tile.

BRIEF DESCRIPTION OF THE SEVERAL VIEWS OF THE DRAWING(S)

DETAILED DESCRIPTION OF THE INVENTION

The present invention relates to mounting structures and methods for mounting photovoltaic solar panels on tiled roofs or other structures.

In one aspect, the present invention comprises a rigid support stand, called a "tile mount structure" or, simply "tile mount", which is used to securely and replaceably mount a lateral attachment bar to a roof. A replacement tile is disposed in-between the tile mount and the attachment bar, and a piece of flashing is disposed in-between the tile mount and the underlying roof. The tile mount can be made, for example, of cast or molded aluminum or aluminum alloy, or zinc or zinc alloy, or printed using 3-D techniques as 3-D laser sintered aluminum, aluminum alloy, zinc, or zinc alloy. Alternatively, the tile mount can be made of a polymer, plastic, or fiber-reinforced polymeric material, either as a cast or injection molded part or a 3-D printed part.

Figure 1A:
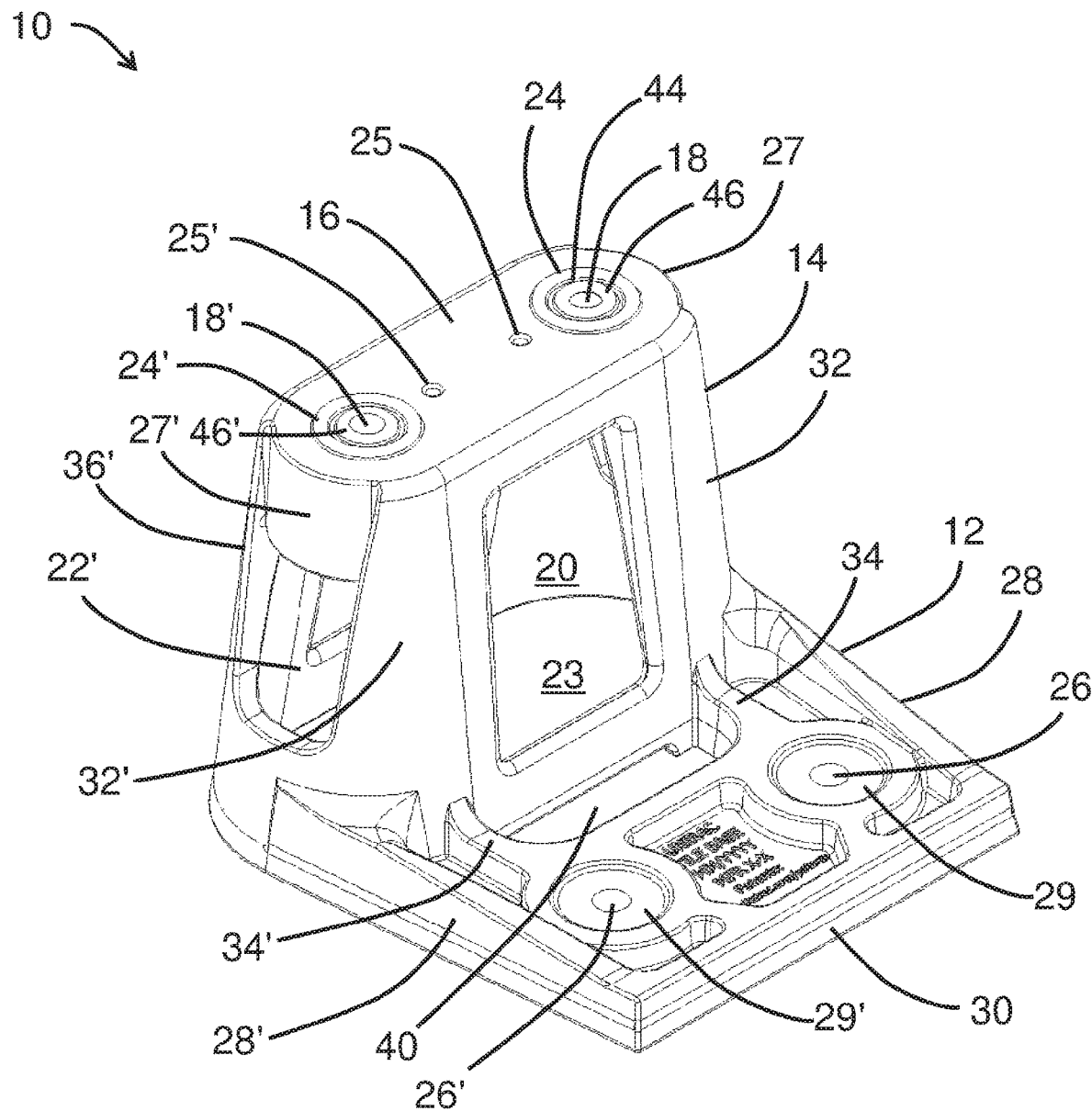
FIG. 1A shows a perspective view of an example of a tile mount, according to the present invention.

FIG. 1A shows a perspective view of a first example of a tile mount 10, according to the present invention. One-piece, monolithic "L"-shaped tile mount 10 comprises a base 12 with an integral, monolithic vertical riser 14 defining a pair of vertically-aligned mounting holes 18 and 18' disposed on a horizontal top platform 16. Mounting holes 18 and 18' can be plain holes (without threads) or they can be holes with machine threads disposed inside of the holes, or they can be a mixed combination thereof (one without threads and one with threads). In the former case of having plain (unthreaded) holes, self-tapping screws can be used to cut threads in the material surrounding holes 18 and 18'. In the latter case of having threaded holes 18 and 18', machine bolts can be used to mate with the machine threads inside of the holes. Alternatively, a nut and bolt combination can be used with holes 18 and 18' when they are unthreaded, through-holes. Riser 14 is a substantially hollow structure with a hollow internal volume 23, an open floor (bottom), closed top 16, and four optional cutouts (windows) 20, 22, (FIGS. 3-4) 20', and 22' for reducing weight, and for improving ease of handling (grippability). Four vertical legs 32, 32', 36 (FIGS. 3-4) and 36' support platform 16 of tile mount 10. Two pairs of raised/protruding, concentric, sealing rings 24 and 46 (24' and 46'), with a recessed groove 44 (44' (FIG. 6)) disposed in-between them, surround mounting holes 18 and 18', respectively, and serve as a waterproof sealing system between the replacement tile (not shown) and tile mount 10. Sealing rings 24 and 46 are centered on mounting holes 18 and 18'. Sealing rings 24 and 46 can have a circular, oval, square, or any non-circular shape; they just need to be a continuous ring of raised, protruding material. Alternatively, tile mount 10 can comprise single sealing rings 24 and 24' each surrounding one of the mounting holes 18 and 18'. Platform 16 comprises a second pair of holes 25 and 25' for receiving a pair of locating magnets (item 70, see FIG. 14) that are mounted therein (e.g. by gluing with epoxy adhesive or by press fit).

Referring still to FIG. 1A, tile mount 10 further comprises a supporting base 12 that forms the lower part of the "L"-shaped structure, which is oriented perpendicular to the vertical axis of riser structure 14. Base 12 rests against flashing 64 (not shown in FIG. 1A), which rests against the underlying roof 69 (See FIG. 4). Base 12 comprises a pair of integral side support arms 28 and 28', which are joined to an integral front support arm 30 to form a rigid support frame. A pair of through-holes 26 and 26' in respective flat areas 29 and 29' are defined in base 12, which receive a pair of lag screws (not shown in FIG. 1A) used for mounting the base 12 to roof 60 through flashing 64 (see FIG. 9). An open cutout (window) 40 is disposed in base 12, which is defined by supporting web segments 34 and 34'. Integral blocks 27 and 27', in which the mounting holes mentioned are formed, are also shown in FIG. 1A.

Figure 1B:
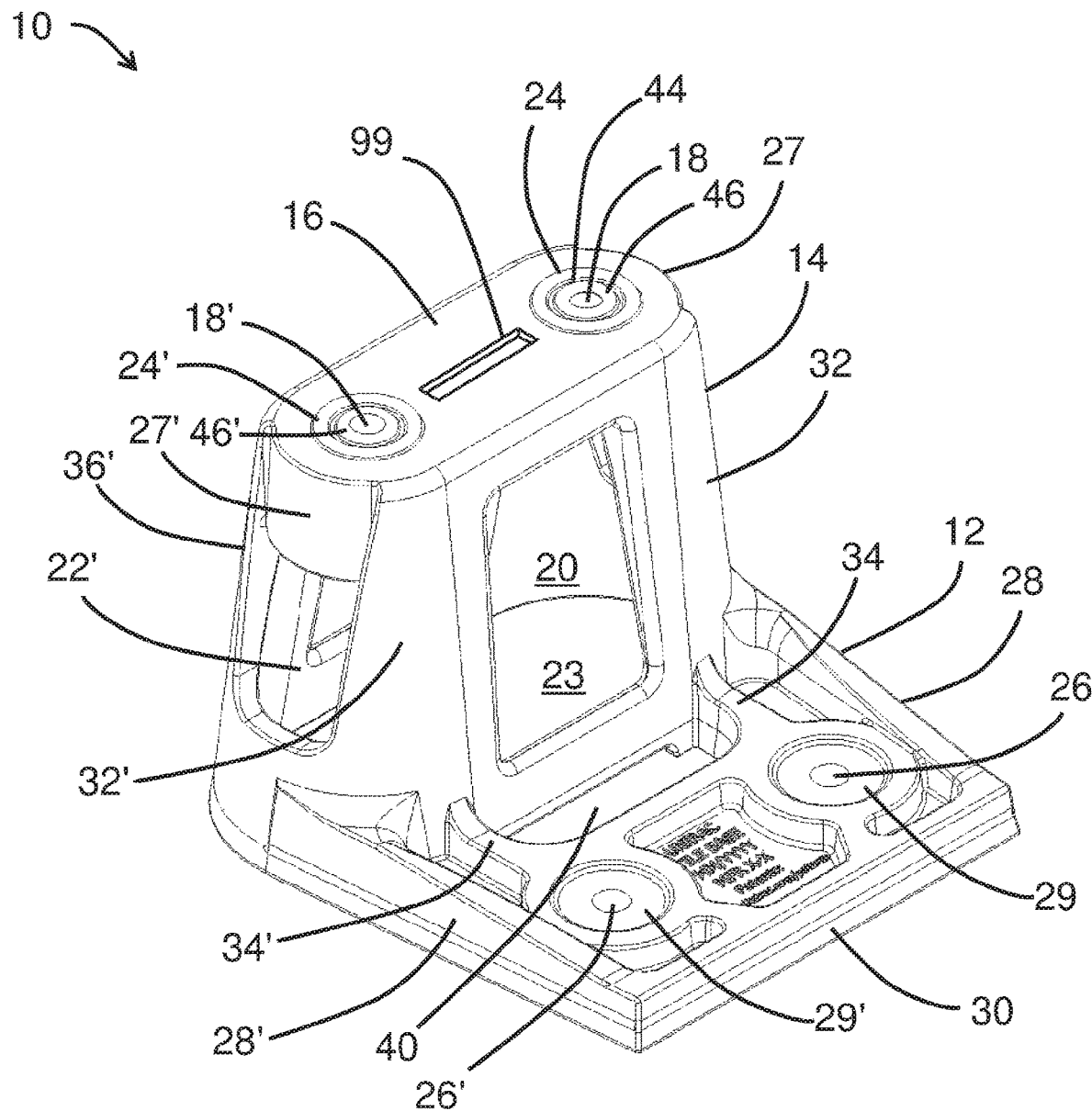
FIG. 1B shows a perspective view of a second example of a tile mount, according to the present invention.

FIG. 1B shows a perspective view of a second example of a tile mount 10, according to the present invention. This example is identical to the first example shown in FIG. 1A, except that the arrangement of magnets are different. In FIG. 1B, a rectangular (linear) recess 99 is disposed in the upper platform 16 (instead of two, spaced-apart holes 25 and 25'). In the case of a rectangular recess 99, a straight, rectangular piece of magnet (not shown) is mounted (e.g., glued or press fit) into the recess 99.

Figure 2:
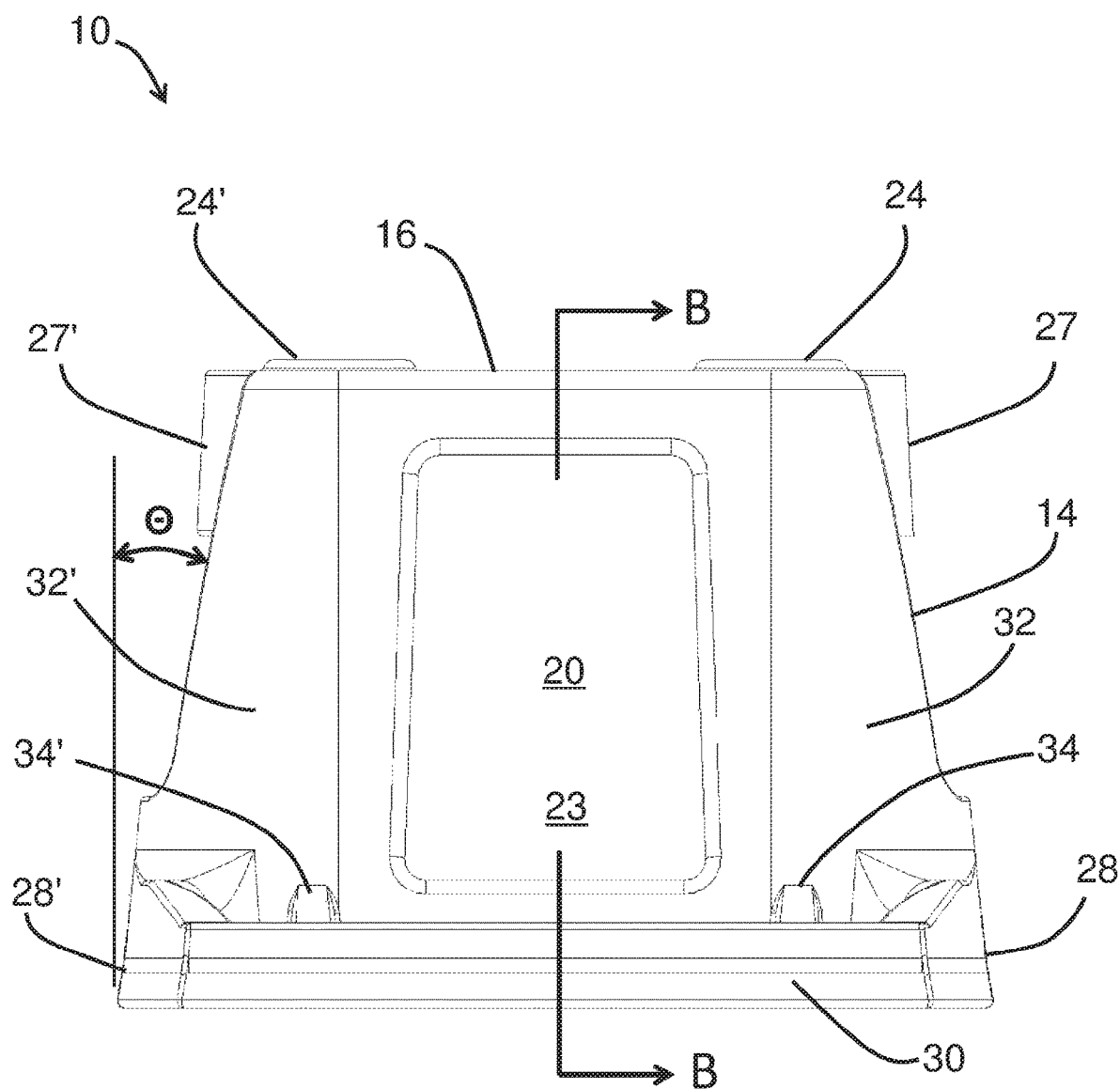
FIG. 2 shows a front elevation view of an example of a tile mount, according to the present invention.

FIG. 2 shows a front elevation view of the first example of tile mount 10, according to the present invention. Riser 14 comprises vertical support legs 32 and 32', with a cutout window 20 disposed in-between legs 32 and 32'. Raised rings 24 and 24', concentric with the mounting holes 18 and 18' and the rings 46 and 46', can be seen on the top of platform 16. Tile mount 10 is symmetric across plane "B-B". Riser 12 is tapered with a taper angle=θ, which can range, for example, from 10° to 30°. Having a tapered vertical angle for riser 14 allows for multiple tile mounts 10 to be stacked on top of each in a compact arrangement for ease of shipping.

Figure 3:
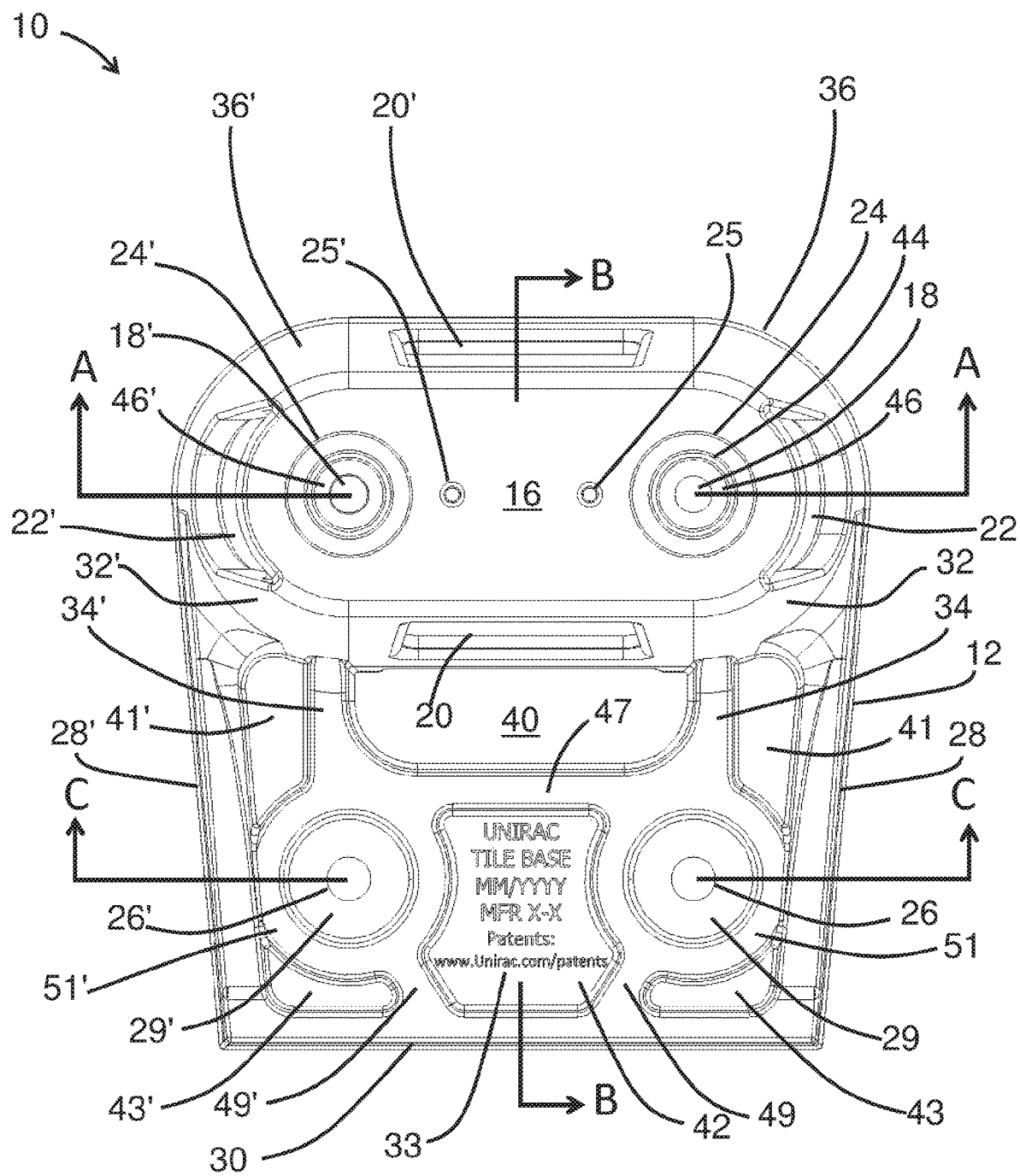
FIG. 3 shows a top plan view of an example of a tile mount, according to the present invention.

FIG. 3 shows a top plan view of the first example of a tile mount 10, according to the present invention. One-piece, monolithic "L"-shaped tile mount 10 comprises a base 12 with an integral, monolithic vertical riser 14 (FIGS. 1A, 1B, and 2) defining a pair of mounting holes 18 and 18' disposed on a horizontal platform 16. Riser 14 is a substantially hollow structure with an open floor (bottom), a closed top 16, and four cutouts (windows) 20, 22, 20', and 22'. Four vertical legs 32, 32', 36 and 36' support the top platform 16 of tile mount 10. Two pairs of raised, protruding concentric, circular rings 24 and 46 (24' and 46'), with a recessed groove 44 (44' (FIG. 6)) disposed in-between them, surround mounting holes 18 and 18', respectively, and serve as a waterproof seal between the replacement tile (not shown) and tile mount 10. Platform top 16 comprises a second pair of holes 25 and 25' for receiving a pair of locating magnets (item 70, see FIG. 14) that are mounted therein. Tile mount 10 is symmetric across plane "B-B".

Referring still to FIG. 3, tile mount 10 further comprises a supporting base 12 that forms the lower part of the "L"-shaped structure. Base 12 comprises a pair of integral side support arms 28 and 28', which are joined to an integral front support arm 30 to form a rigid support frame. A pair of through-holes 26 and 26' in flat areas 29 and 29', respectively, are defined in base 12, which receive a pair of lag screws (not shown) used for mounting the base 12 to roof 69 (FIG. 4) through flashing 64 (see FIG. 9). An open cutout (window) 40 is disposed in base 12, which is defined by supporting web segments 34 and 34' and 47. Other recessed pans in base 12 include recesses 41, 41', 43, and 43', which serve to lighten the weight of tile mount 10 (as do cutouts 20, 20', 22, and 22'). Supporting rings 51 and 51' support the material surrounding mounting holes 26 and 26', respectively. Web segments 49, 47, 34, and arm 28 structurally support ring 51, (and likewise the web segments 49', 34' and the arm 28 on the opposite side structurally support ring 51'). A recessed (depressed) pan (or well) 42 is disposed in base 12, which has identifying company information 33 embossed or printed on the upward-facing surface of pan 42.

Figure 4:
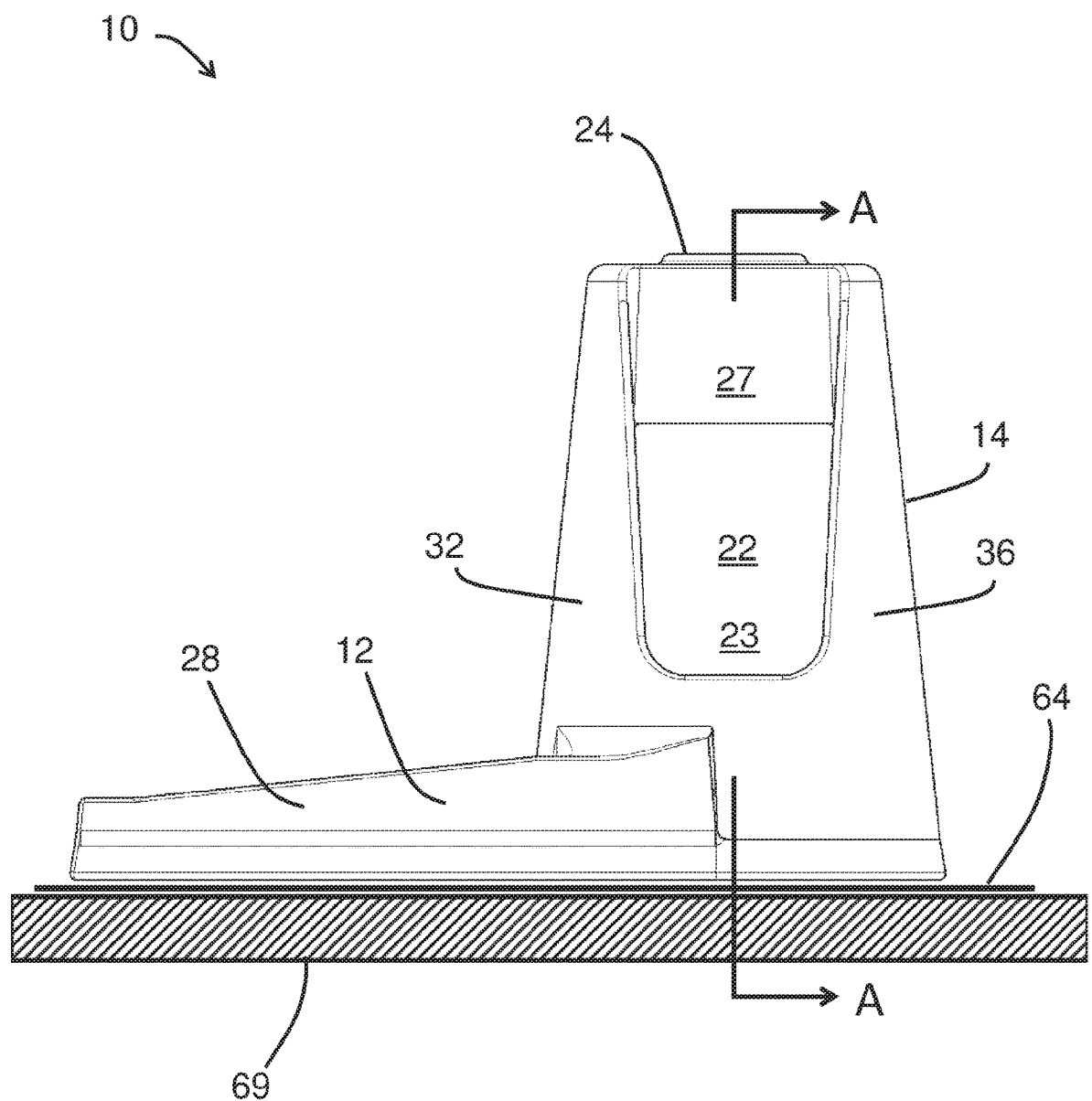
FIG. 4 shows a side elevation view of an example of a tile mount, according to the present invention.

FIG. 4 shows a side elevation view of the first example of a tile mount 10, according to the present invention. The "L"-shape of tile mount 10 can be readily seen in FIG. 4, as can the hollow internal volume 23 and the sealing ring 24. Support legs 32 and 36 of riser 14 are tapered at a shallow angle to the vertical (10° to 20°, for example), which allows multiple units to be stacked on top of one another when being shipped. Integral block 27 contains through hole 18 (FIGS. 1A, 1B, and 3) for receiving a threaded screw or machine bolt (not shown). The "L"-shaped base 12 can be seen, along with tapered side arm 28. Base 12 sits against flashing 64, which is mounted on top of underlying roof structure 69.

Figure 5:
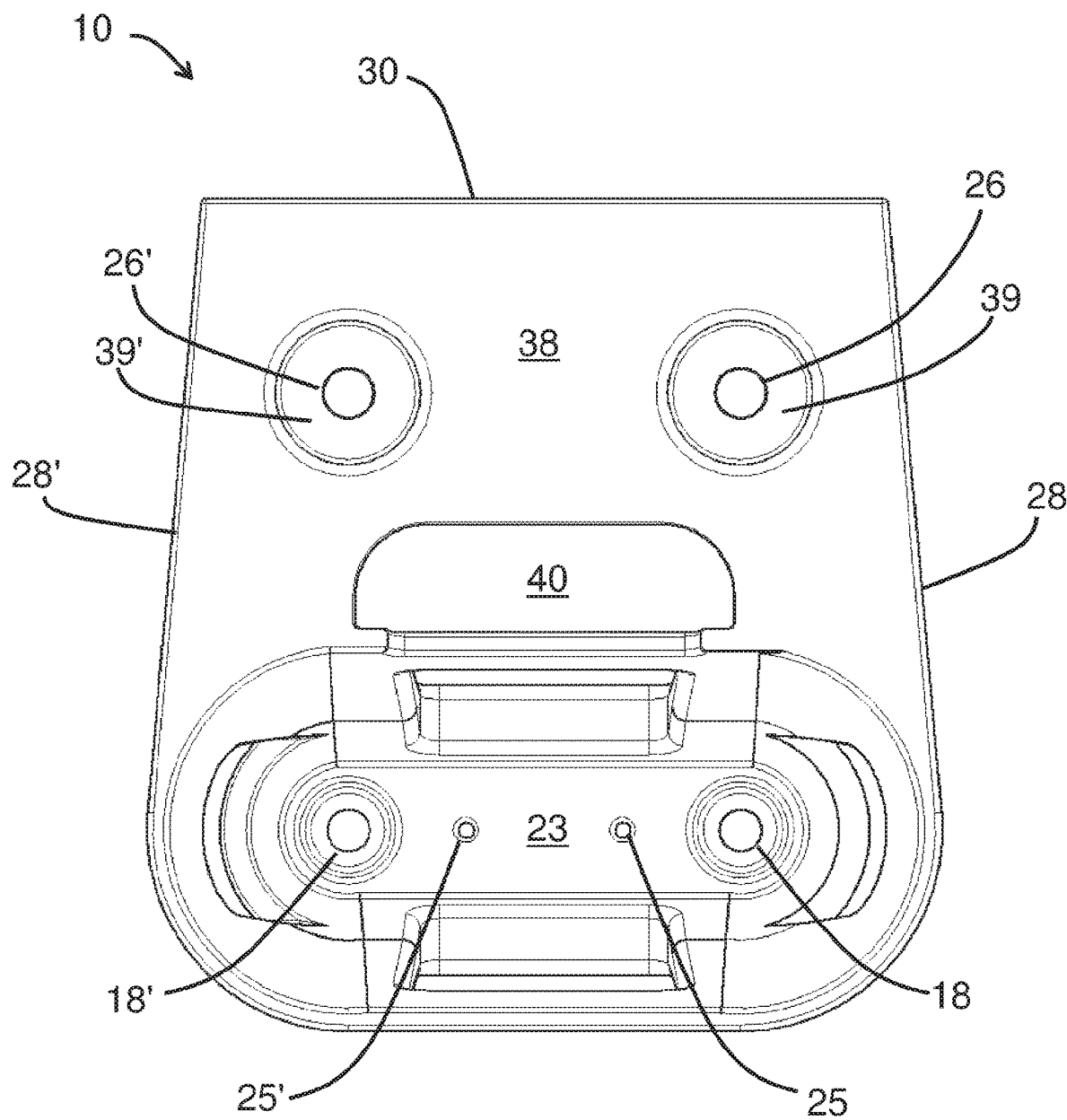
FIG. 5 shows a bottom plan view of an example of a tile mount, according to the present invention.

FIG. 5 shows a bottom plan view of the first example of a tile mount 10, according to the present invention. The bottom-side of base 12 (FIGS. 1A, 1B, and 3-4) shows bottom pan 38, which is relatively flat, except for recesses or recessed sections 39 and 39' defining the rings that define through-holes 26 and 26'. The other elements indicated in FIG. 5 are discussed above, and another discussion of these elements is not unnecessarily supplied here.

Figure 6:
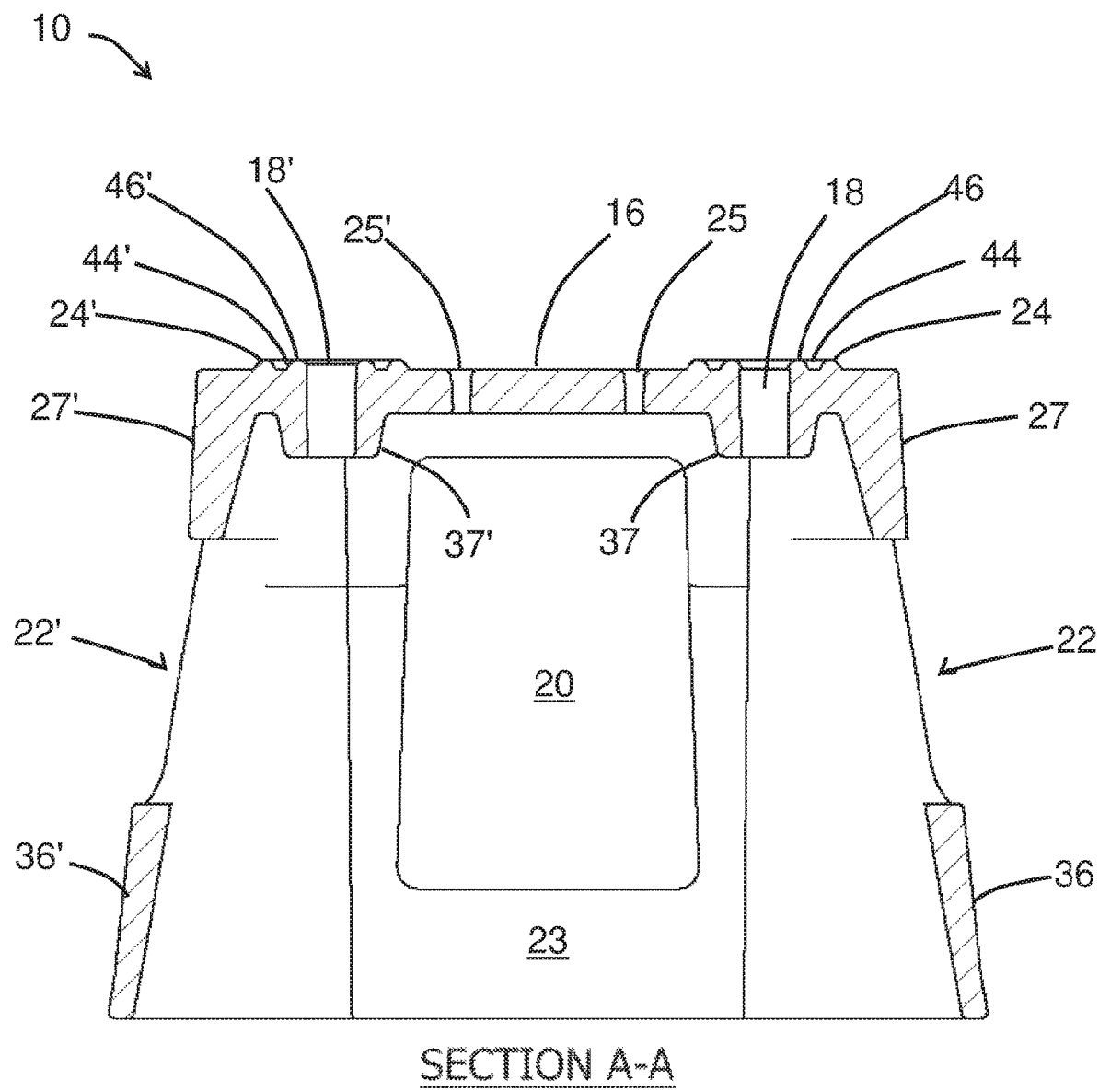
FIG. 6 shows a cross-sectional cut (Sec. A-A) of a front elevation view of an example of a tile mount, according to the present invention.

FIG. 6 shows a cross-sectional cut (Sec. A-A of FIG. 4) of a front elevation view of an example of a tile mount, according to the present invention. In this view, we see an upper cross-section that comprises a pair of vertically-aligned holes 18 and 18' for receiving a pair of self-tapping screws (not shown), and a pair of holes 25 and 25' for receiving a pair of magnets (not shown). Molded into the upper platform 16 are two pair of raised, concentric rings 24 (24') and 46 (46'), separated by a circular groove 44 (44'). These raised protrusions serve to locally deform the thin-walled, sheet of metal replacement tile piece (not shown)

when clamped to the top of upper platform 16, which provides excellent metal-to-metal waterproof sealing capability. Holes 25 and 25' are drawn as through-holes, but optionally they can be partial-thickness holes (e.g., at a depth of ½ of the wall thickness). The cross-sectional thickness around the location of holes 18 and 18' can be thicker (e.g., twice as thick) than the central portion's thickness (see bosses 37 and 37'). The other elements indicated in FIG. 6 are discussed above, and another discussion of these elements is not unnecessarily supplied here.

Figure 7:
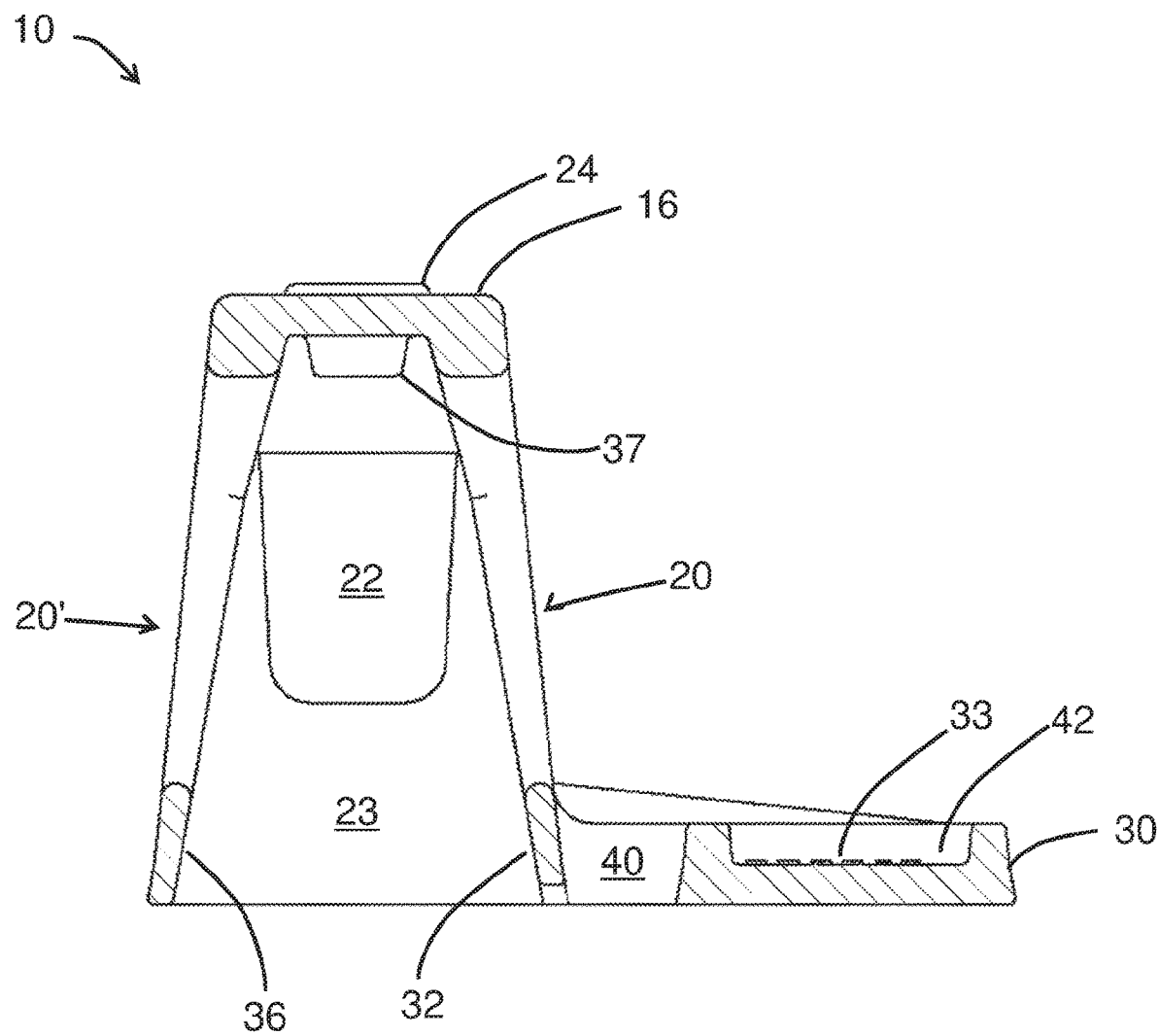
FIG. 7 shows a cross-sectional cut (Sec. B-B) of a side elevation view of an example of a tile mount, according to the present invention.

FIG. 7 shows a cross-sectional cut (Sec. B-B, FIGS. 2-3) of a side elevation view of an example of a tile mount, according to the present invention. In this view, we see a pair of openings 20 and 20' that are cutout of the supporting vertical riser sections 32 and 36, respectively, that support upper platform 16. Also, we see the recessed section (pan) 42, which contains the raised (embossed) or printed identifying company information 33. Front support segment 30 can be seen, as can the opening or window 22, the inner volume 23, the sealing ring 24, and the boss 37.

Figure 8:
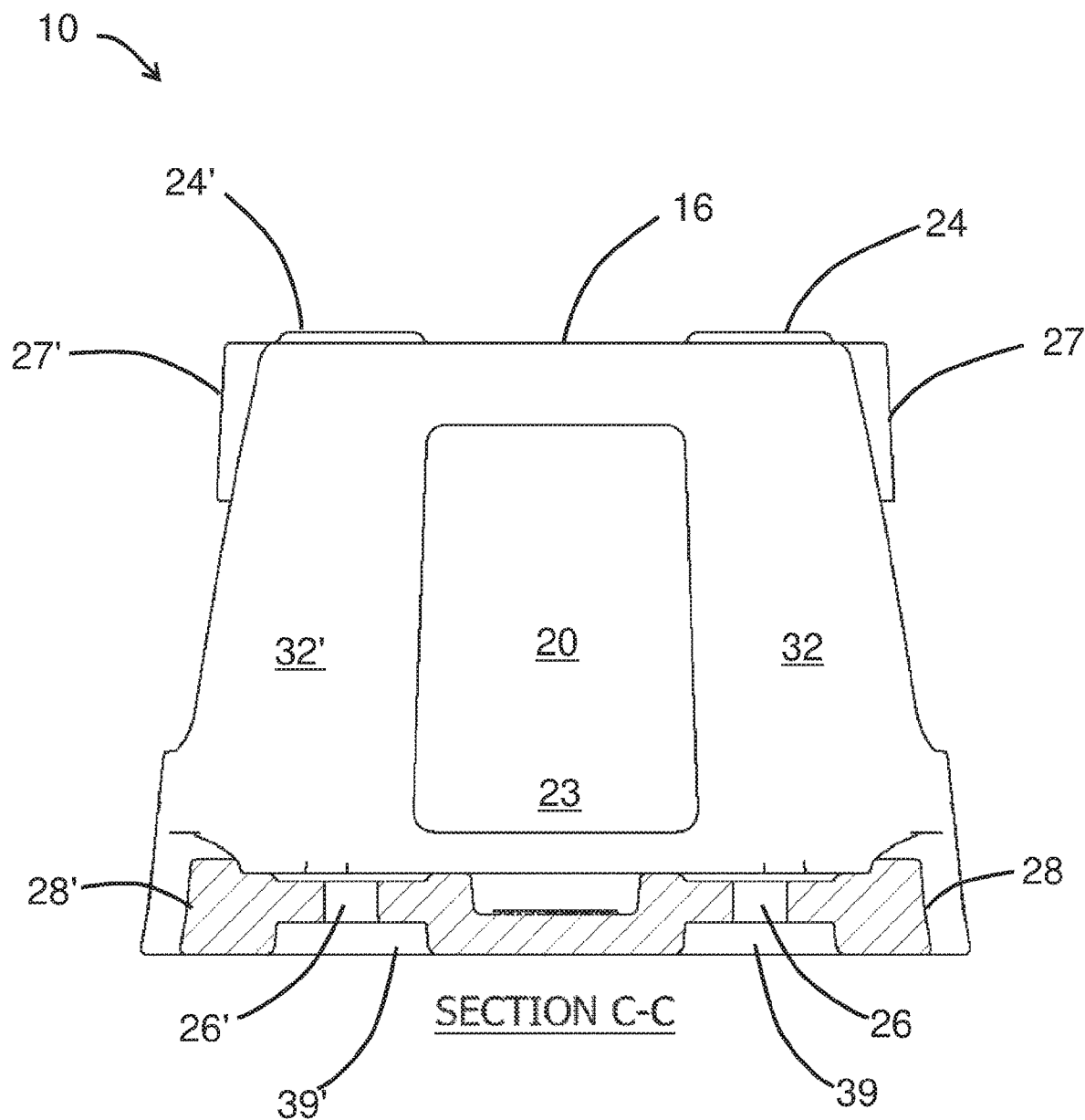
FIG. 8 shows a cross-sectional cut (Sec. C-C) of another front elevation view of an example of a tile mount, according to the present invention.
Figure 9:
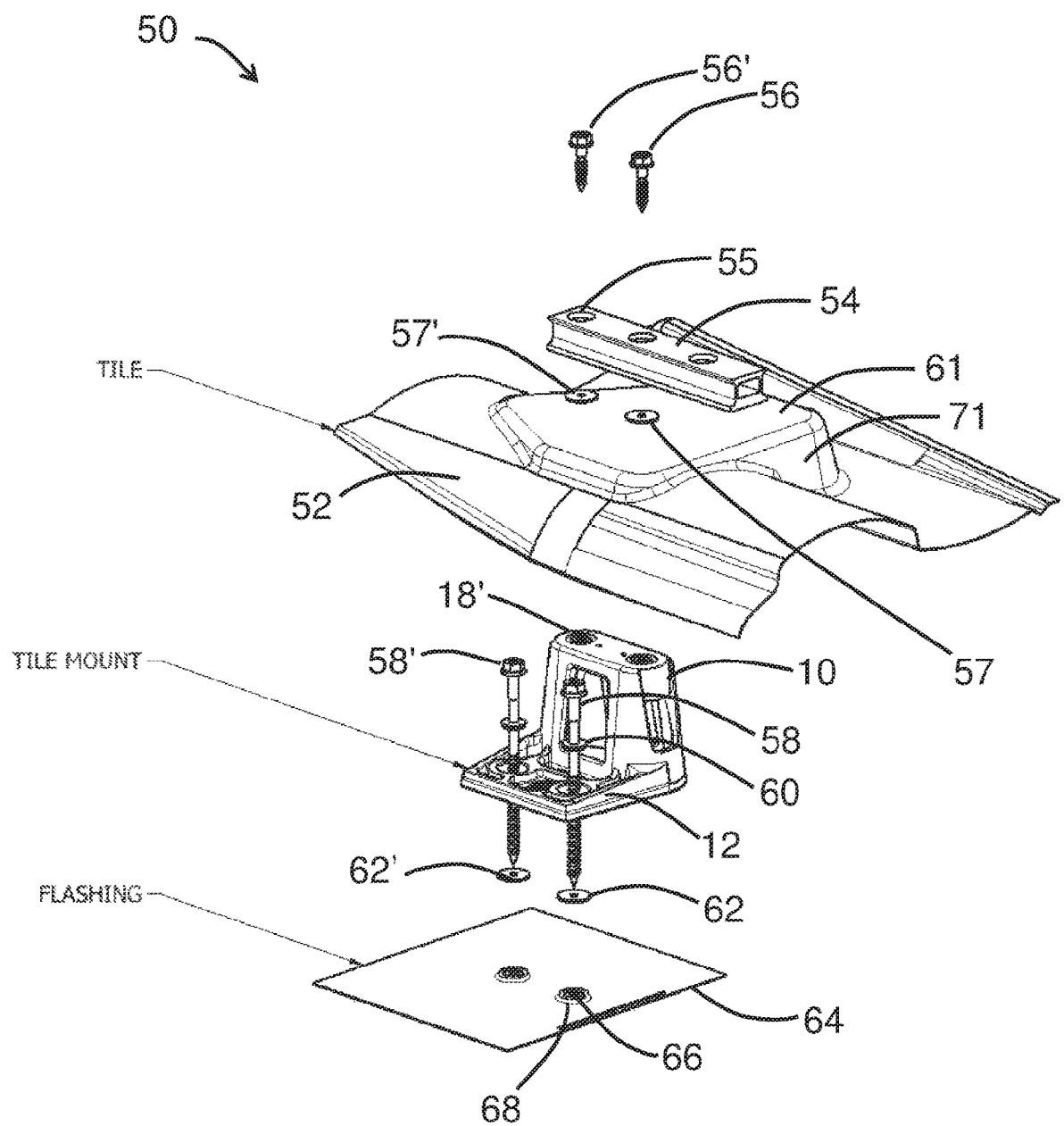
FIG. 9 shows a perspective exploded view of an example of a replacement tile solar mount sub-assembly, according to the present invention.

FIG. 8 shows a cross-sectional cut (Sec. C-C, FIG. 3) of another front elevation view of an example of a tile mount, according to the present invention. The shaded cross-sectional area shows the pair of through-holes 26 and 26', which are used to receive a pair of lag screws for attaching tile mount 10 to a roof. Recessed sections 39 and 39' can also be seen, which receive washers 62 and 62', respectively, as shown in FIG. 9. Once again, the other elements indicated in FIG. 8 are discussed above, and another discussion of these elements is not unnecessarily supplied here.

FIG. 9 shows a perspective exploded view of an example of a replacement tile solar mount sub-assembly 50, according to the present invention. Assembly 50 comprises a lateral attachment bar 54 (which the solar panels mount to via a slidable, height-adjustable mounting mechanism (not shown)), which is attached to tile mount 10, with a sheet-metal replacement tile 52 disposed in-between tile mount 10 and attachment bar 54. Attachment means 56, 56' (which can be a machine bolt or a self-tapping screw) attaches attachment bar 54 having an oversized through-hole 55 to tile mount 10, with flat washer 57, 57' disposed in-between them. Replacement tile 52 can be a S-shaped tile. Other shapes can include: a W-shape or a flat shape. Tile mount 10 is attached to underlying roof 69 (FIG. 4) with attachment lag screws 58, 58', each of which passes through a respective hole 66 in flashing 64. A rubber or EDPM soft washer 60 is used in-between the head of each screw 58, 58' and base 12 of tile mount 10. Flat washer 62 can be optionally used in-between base 12 of tile mount 10 and flashing 64. Flashing 64, which is a flat sheet of metal (e.g. anodized aluminum), can comprise one or two raised, dual circular rings 68 that surrounds or surround through-hole 66, and that provides or provide waterproofing resistance. Replacement tile 52 has a flattened portion 61 at the middle of tile 52 for mating to flat platform 16 (FIGS. 1A-1B) of tile mount 10. The raised sidewalls 71 (sleeve/rim) supporting the flattened portion (i.e., platform) 61 can have a five-sided pentagonal shape, as shown in FIGS. 9, 10, 11, and 13. The pointed, tent-shape at the uphill apex 63 (FIGS. 10-13) of platform 61 serves to divert water flowing over the top of replacement tile 50. The top flattened platform 61 of replacement tile 52 can optionally be made of an over-molded, polymeric membrane, such as TPO or EDPM, which is easily penetrated or punched-through by the sharp points of self-tapping screws 56 and 56'. The polymeric membrane 61 can be sufficiently thin so as to allow an installer's finger to palpate the membrane to feel for a raised sealing ring 24 or 24' described above and/or depressed mounting hole such as the hole 18' indicated disposed underneath, i.e., to locate the centerline of the mounting hole. Flat washer 57 and/or 62 can be a soft washer, for example, EDPM or rubber or compressible elastomeric foam. Alternatively, flat washer 57 and/or 62 can be made of dead soft, annealed copper or aluminum, which will deform plastically when clamped to seal rings 24 and/or 46, and which will make an excellent sealing gasket that will have a long lifetime in the environment outside on a roof.

Figure 10:
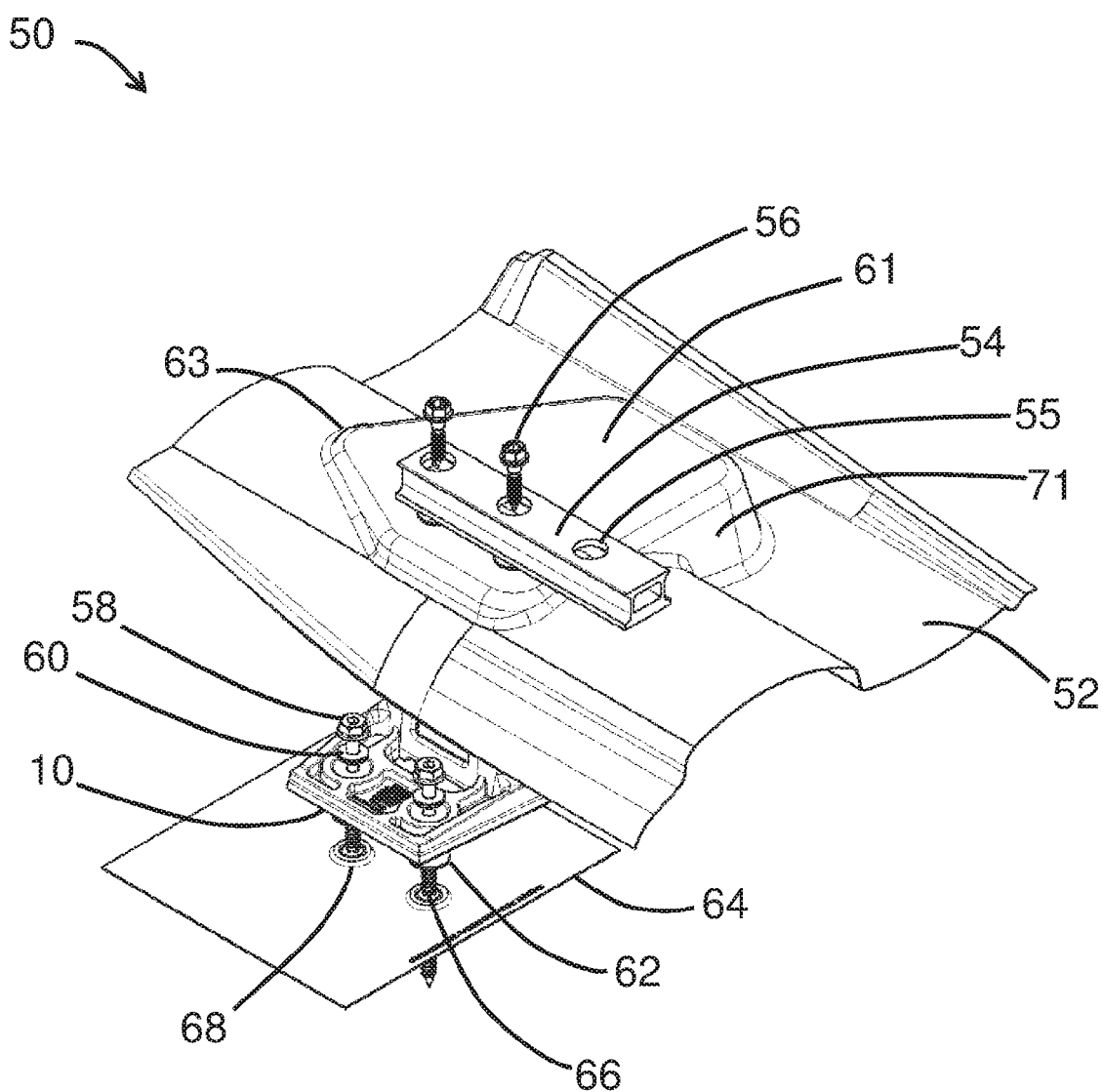
FIG. 10 shows another perspective view of an example of a replacement tile solar mount sub-assembly, according to the present invention.

FIG. 10 shows another perspective exploded view of an example of a replacement tile solar mount assembly 50, according to the present invention. Oversized through-hole 55 in attachment bar 54 provides access for driving first attachment screw (or bolt) 56 to attach bar 54 to tile mount 10 through replacement tile 52. The other elements indicated in FIG. 10 are discussed above, and another discussion of these elements is not unnecessarily supplied here.

Figure 11:
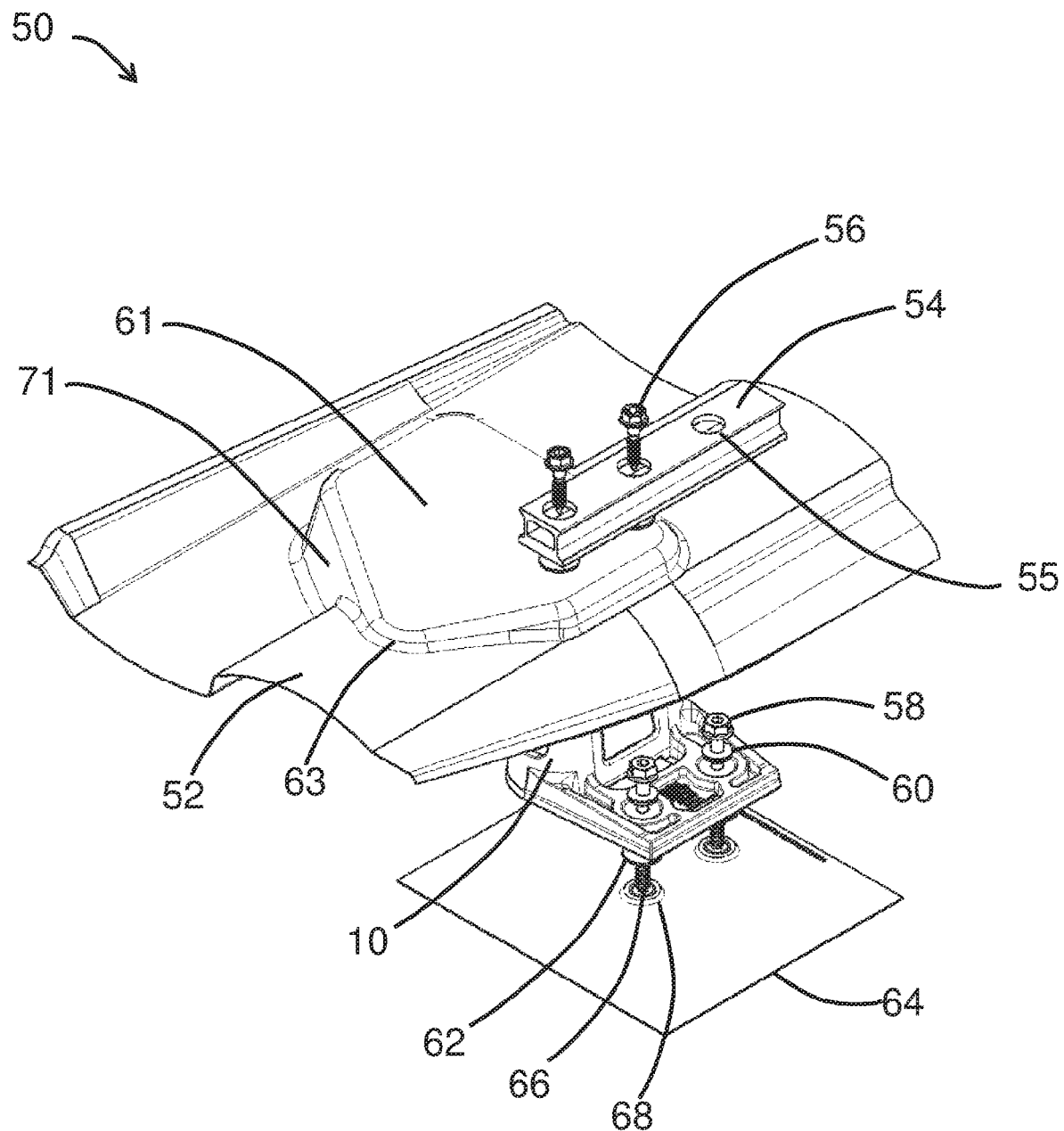
FIG. 11 shows another perspective view of an example of a replacement tile solar mount sub-assembly, according to the present invention.

FIG. 11 shows another perspective exploded view of an example of a replacement tile solar mount sub-assembly 50, according to the present invention. Elements of the sub-assembly indicated in FIG. 11 are discussed above, and another discussion of these elements is not unnecessarily supplied here.

Figure 12:
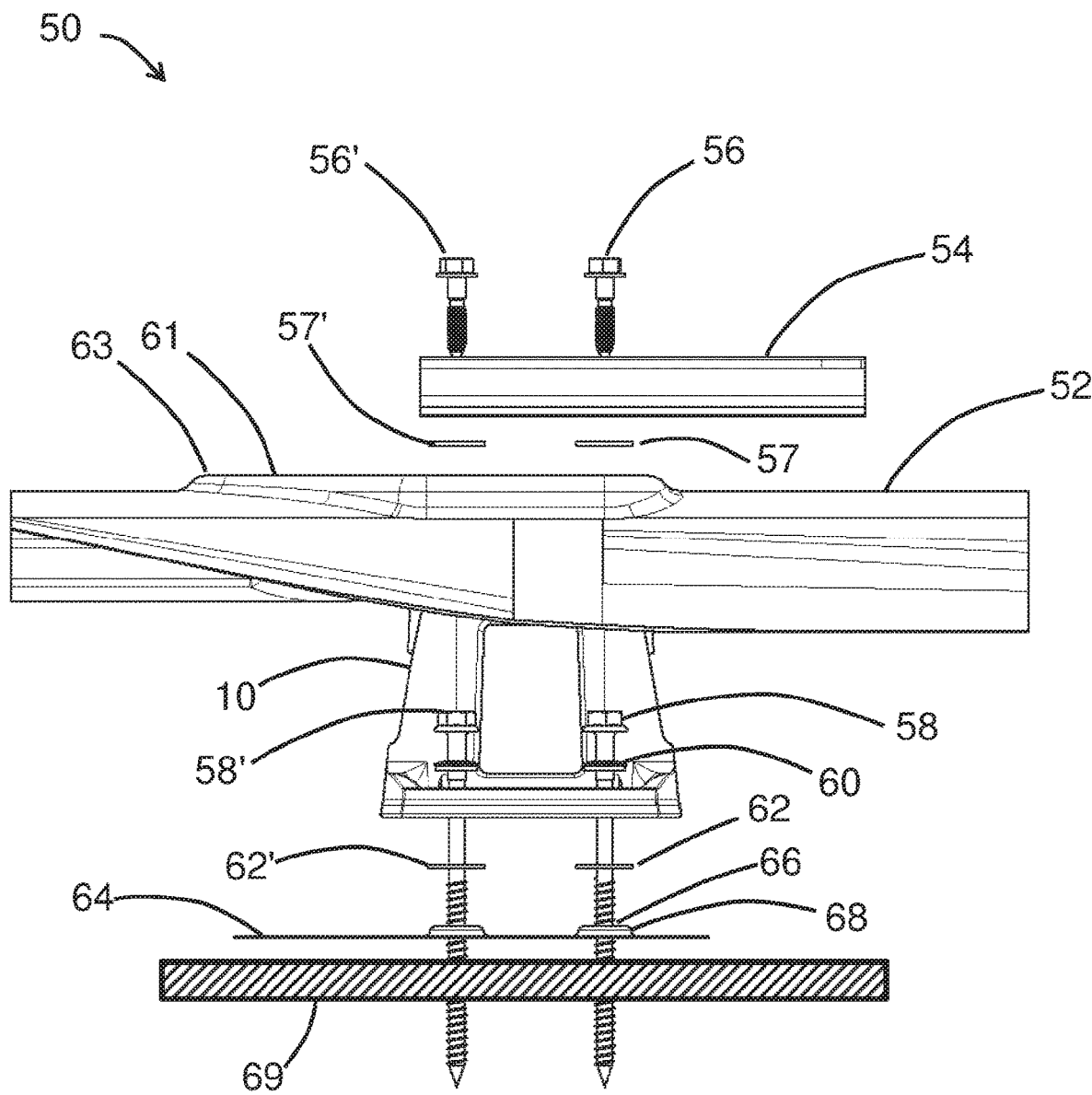
FIG. 12 shows a front elevation view of an example of a replacement tile solar mount sub-assembly, according to the present invention.

FIG. 12 shows a front elevation exploded view of an example of a replacement tile solar mount sub-assembly 50, according to the present invention. Elements of the sub-assembly indicated in FIG. 12, again, are discussed above, and another discussion of these elements is not unnecessarily supplied here.

Figure 13:
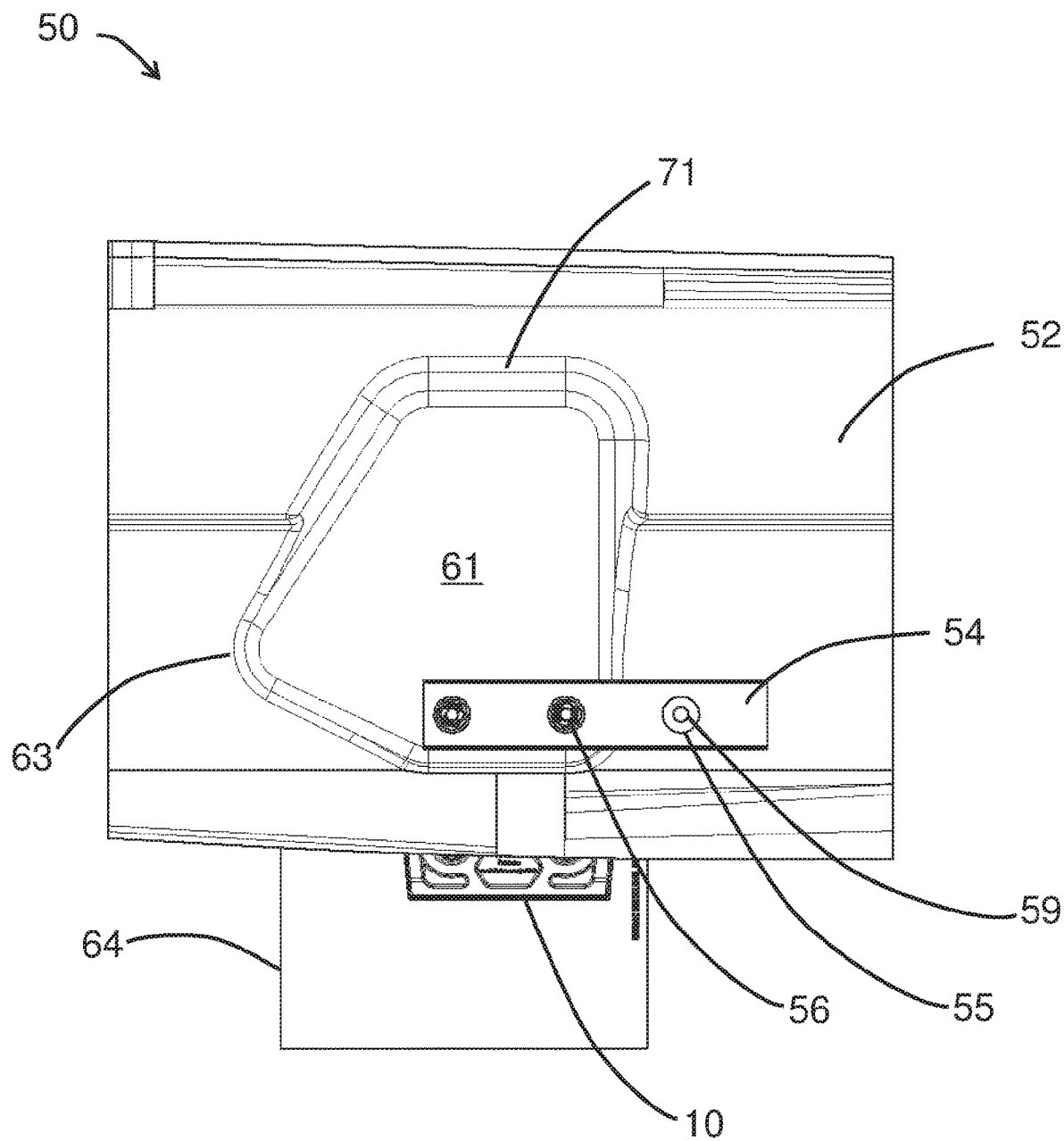
FIG. 13 shows a top plan view of an example of a replacement tile solar mount sub-assembly, according to the present invention.

FIG. 13 shows a top plan exploded view of an example of a replacement tile solar mount sub-assembly 50, according to the present invention. Through-hole 59 in attachment bar 54 can be seen, disposed inside of access hole 55. The tile mount 10, the replacement tile 52, one of the attachment means 56, the flattened partition 61, the uphill apex 63, flashing 64, and a raised sidewall 71 are also indicated.

Figure 14:
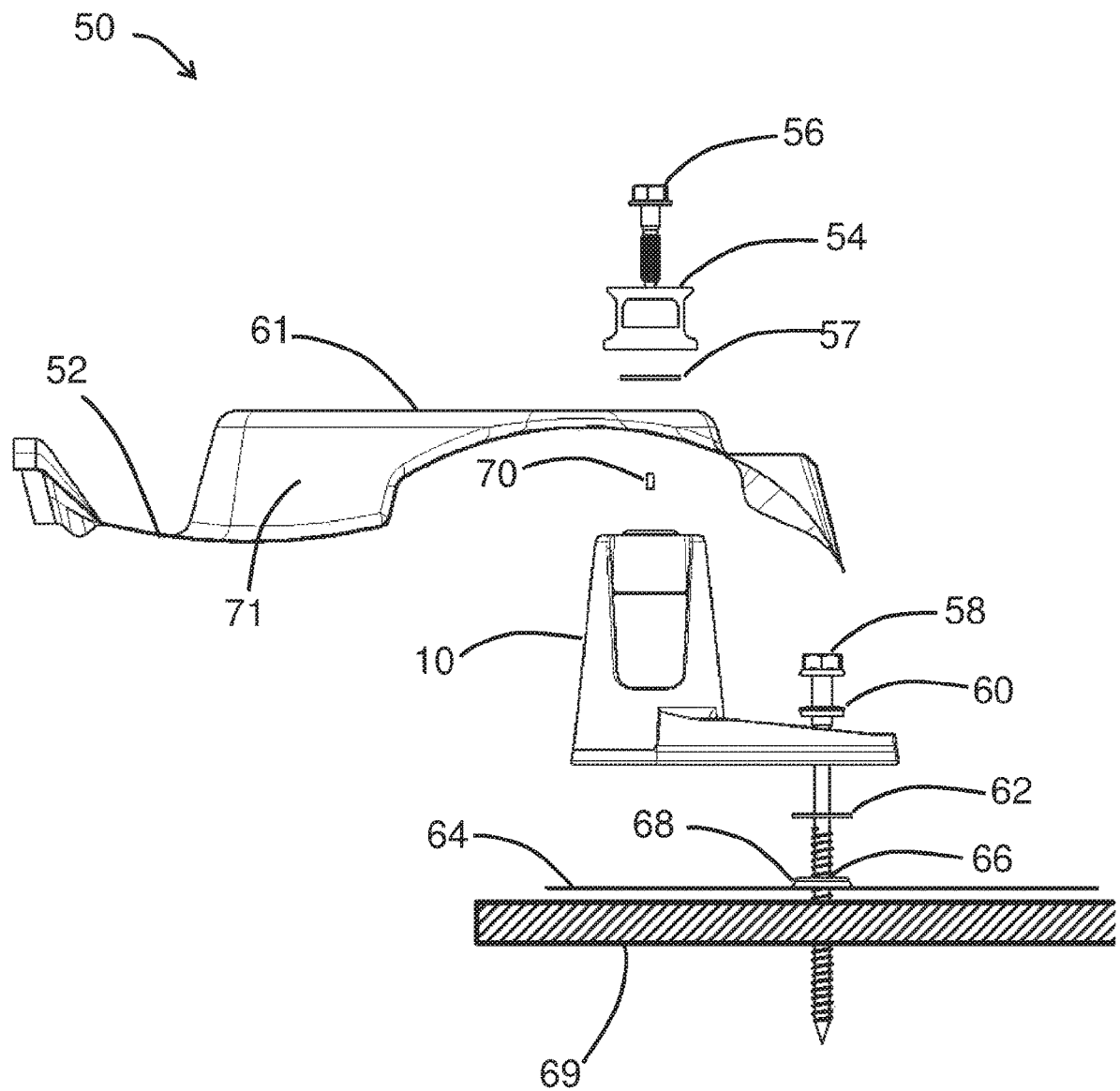
FIG. 14 shows a side elevation view of an example of a replacement tile solar mount sub-assembly, according to the present invention.

FIG. 14 shows a side elevation exploded view of an example of a replacement tile solar mount sub-assembly 50, according to the present invention. One of the positioning magnets 70 can be seen, before being inserted into hole 25 and 25' of platform 16 of tile mount 10 (see FIGS. 1A, 3, and 5-6). Other elements indicated in FIG. 14 are discussed above, and another discussion of these elements is not unnecessarily supplied here.

Figure 15:
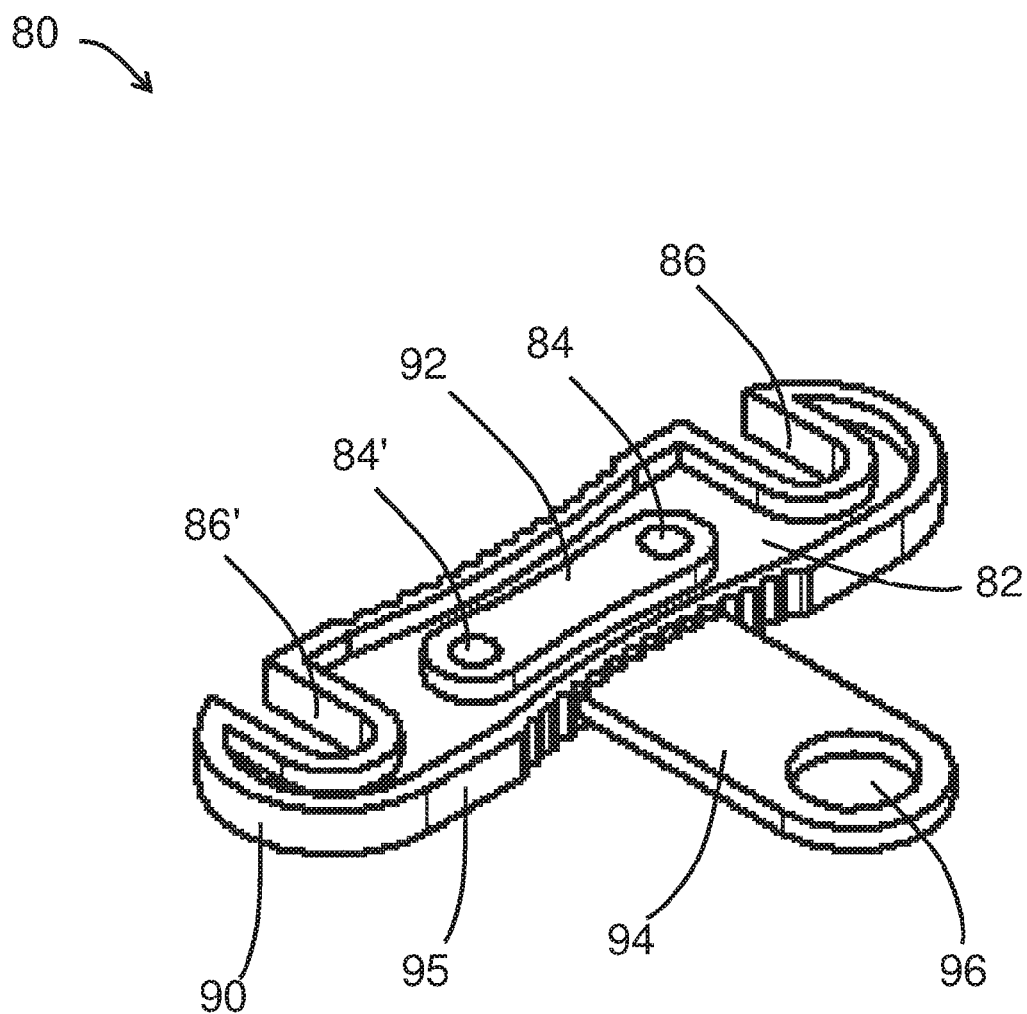
FIG. 15 shows a perspective view of an example of a magnetic positioning tool, according to the present invention.

FIG. 15 shows a perspective view of an example of a magnetic positioning (alignment) tool, according to the present invention. Tool 80 comprises a generally elongated body 82 with a pair of magnets 84 and 84' embedded within a raised platform 92 of the body, disposed symmetrically across a centerline of body 82. The distance (spacing) between the pair of magnets 84 and 84' matches the distance between the pair of holes 25 and 25' in the top of platform 16 of tile mount 10. A pair of U-shaped openings (slots) 86 and 86' are disposed symmetrically across the same centerline of body 82, and the distance between the centerlines of openings 86 and 86' match the distance between the centerlines of mounting holes 18 and 18' in the top of platform 16 of tile mount 10. Alternatively, the slots can be holes. By matching the distances between hole pairs 25 and 25' and the pair of magnets 84 and 84', positioning tool 80 can be used to align a drill bit tool (drill gun) to drill a hole in replacement tile 52 when replacement tile 52 is positioned on top of tile mount 10. This is guided with high precision and accuracy when the tool magnets 84 and 84' come into close proximity to the mating set of magnets 70 in tile mount 10 and "snaps" into place. Positioning tool 80 can be made of any non-magnetic material (e.g., aluminum, zinc, or plastic or polymer), and can be made by casting, injection molding, or 3-D printing. Tool 80 can comprise an optional side tab (handle) 94 with hole 96, which can be large enough to be clipped onto a worker's belt using a carabiner or other type of clip. Tool 82 is also generally small enough to be stored in a worker's pocket, as well. Body 82 can comprises a recessed surface. It's important that magnets 84 and 84' have the same magnetic polarity as the mating magnets 70 and 70' in tile mount 10 in order to have a sufficient attractive force when placed in close proximity to each other (i.e., so that tool 80 "snaps" to tile mount 10 disposed underneath replacement tile 52). An end 90 and a side 95 of the elongated body 82 are also indicated.

Figure 16:
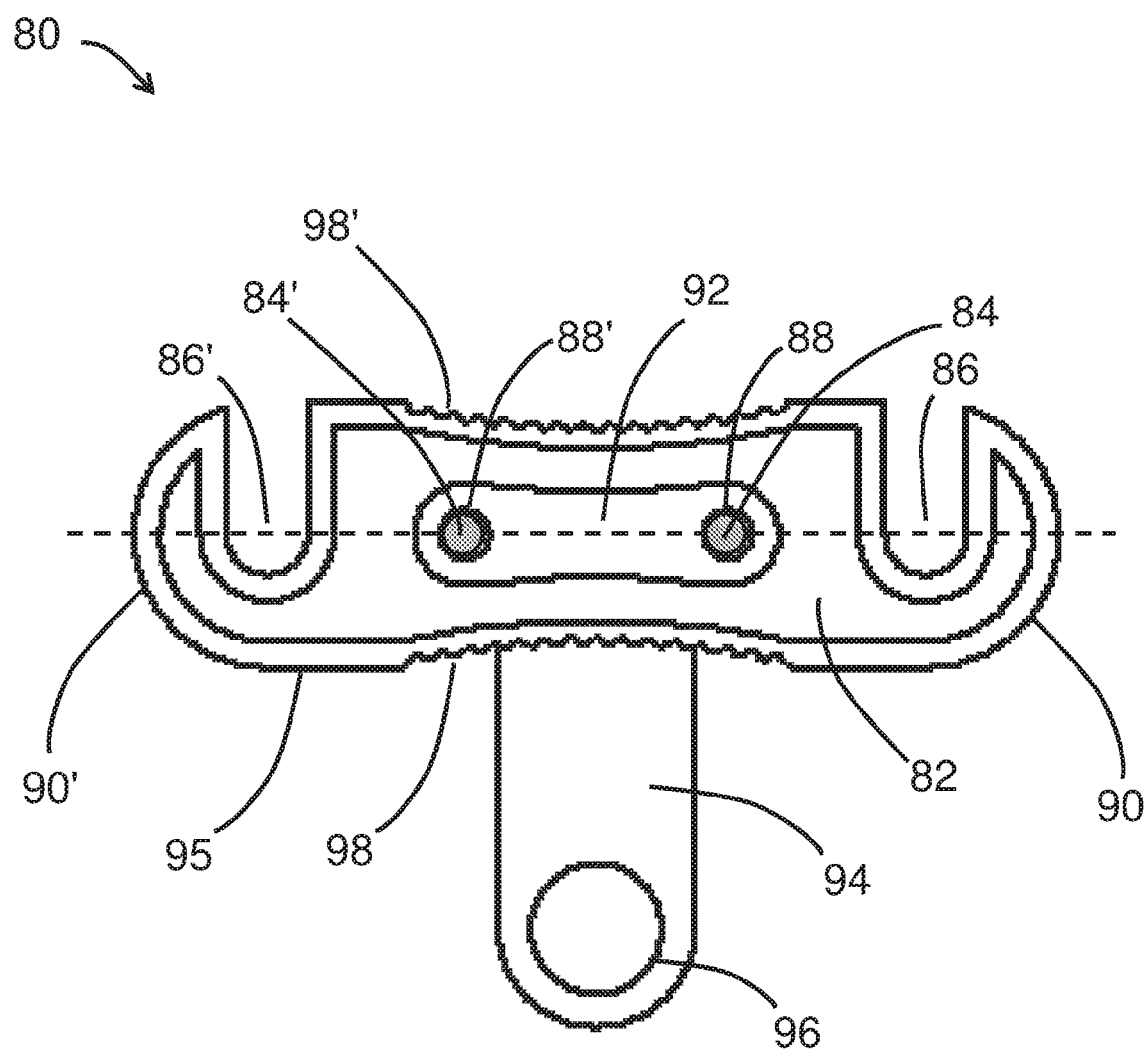
FIG. 16 shows a top plan view of an example of a magnetic positioning tool, according to the present invention.

FIG. 16 shows a top plan view of an example of a magnetic positioning tool, according to the present invention. Magnets 84 and 84' can be mounted in holes 88 and 88' disposed in raised platform 92. Tool 80 can have semi-circular rounded ends 90 and 90' to prevent tool 80 from getting caught when being stored in a worker's pocket. Tool 80 can have a narrowed portion (narrowed waist) with side serrations 98 and 98' to improve the grippability of the tool when wearing gloves. The U-shaped openings (slots) 86 and 86' in the body 82, the tab (handle) 94, the side 95, and the hole 96 are also indicated.

An example of a method of using tool 80 comprises the following steps: (1) removing an existing roofing tile from the roof; (2) positioning flashing 64 on the roof; (3) positioning tile mount 10 on the roof; (4) attaching tile mount 10 to the roof with lag screws 58; (5) positioning replacement tile 52 on top of tile mount 10; (6) positioning magnetic positioning tool 80 on top of replacement tile 52 and moving tool 80 around until the mating magnets "snap" tool 80 into alignment, thereby aligning the pair of openings 86 and 86' in tool 80 with the underlying mounting holes 18 and 18' on tile mount 10; (7) drilling a pair of holes through replacement tile 52 using alignment tool 80 as a drill-hole guide; (8) removing magnetic positioning tool 80; (9) placing a pair of washers 57 over the freshly-drilled holes, and placing lateral attachment bar 54 onto replacement tile 52; (10) aligning holes 55 in bar 54 with the freshly drilled holes; (11) inserting attachment screws or bolts 56 and 56' into holes 55 and 55' of bar 54; and (12) clamping lateral attachment bar 54 to underlying tile mount 10 by tightening attachment screws or bolts 56 and 56' into mounting holes 18 and 18' of tile mount 10, respectively.

Figure 17:
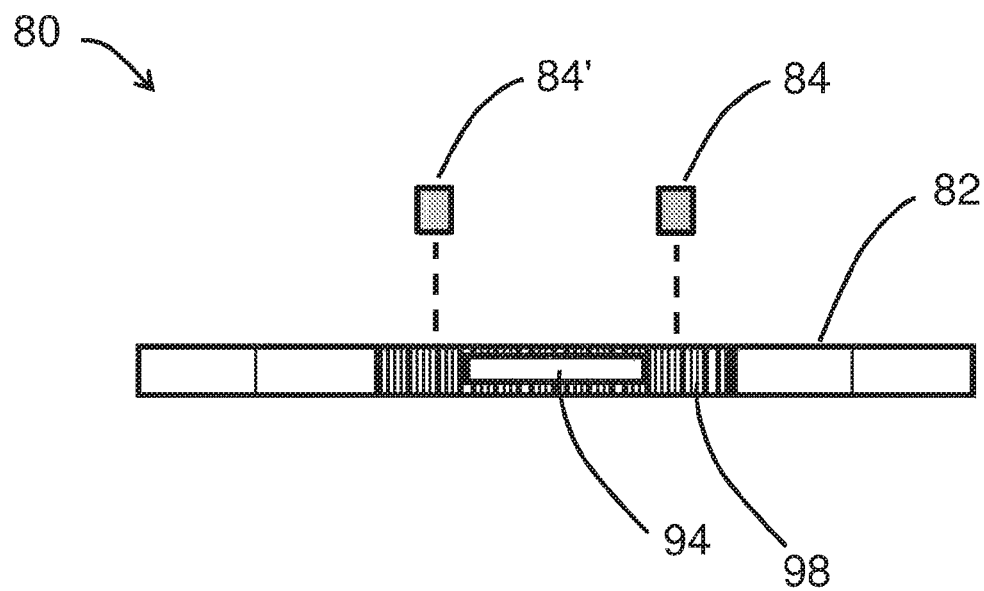
FIG. 17 shows a front elevation view of an example of a magnetic positioning tool, according to the present invention.

FIG. 17 shows a front elevation view of an example of a magnetic positioning tool 80, according to the present invention, with the elongated body 82, the magnets 84 and 84', the optional side tab (handle) 94, and one set of side serrations 98 indicated.

Figure 18:
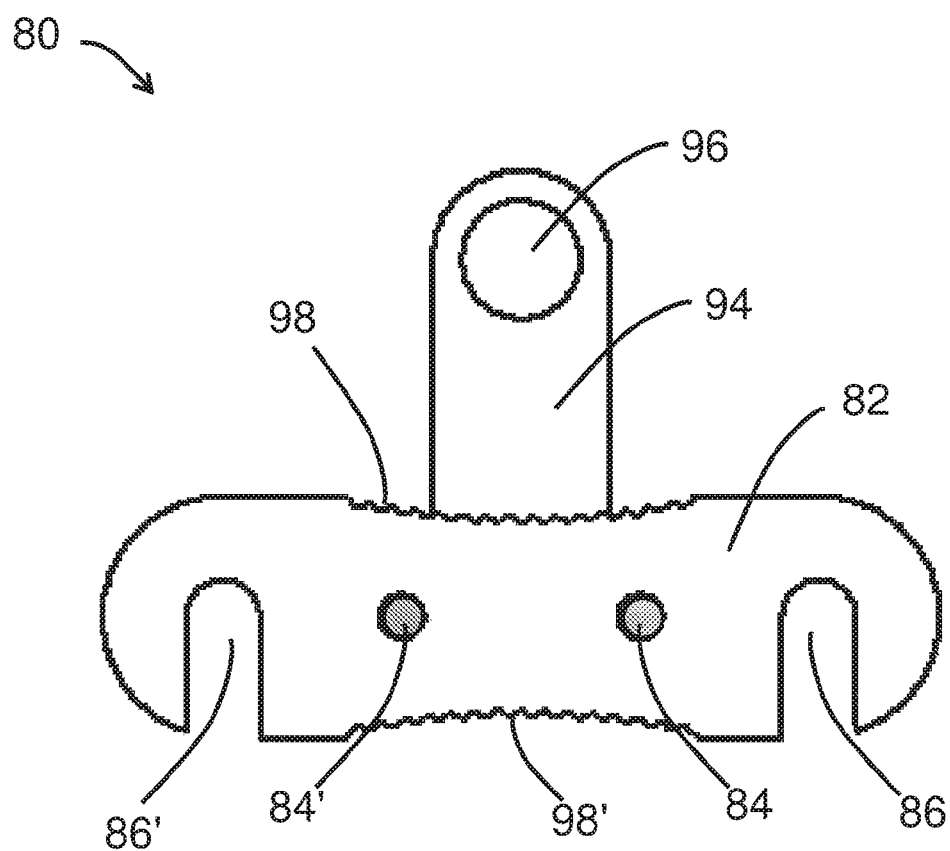
FIG. 18 shows a bottom plan view of an example of a magnetic positioning tool, according to the present invention.

FIG. 18 shows a bottom plan view of an example of a magnetic positioning tool 80, according to the present invention. The bottom of magnets 84 and 84' are mounted flush with the bottom surface of tool 80. The pair of U-shaped openings (slots) 86 and 86' in the elongated body 82, the optional side tab (handle) 94, the hole 96, and side serrations 98 and 98' are also visible.

Figure 19:
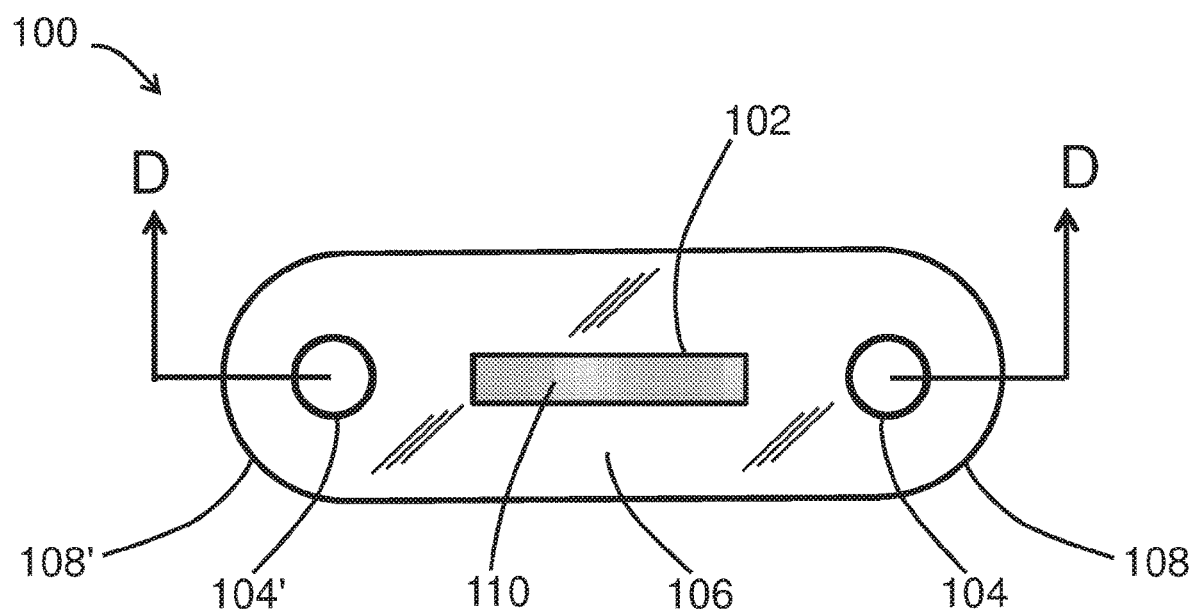
FIG. 19 shows a top plan view of another example of a magnetic positioning tool, according to the present invention.
Figure 20:
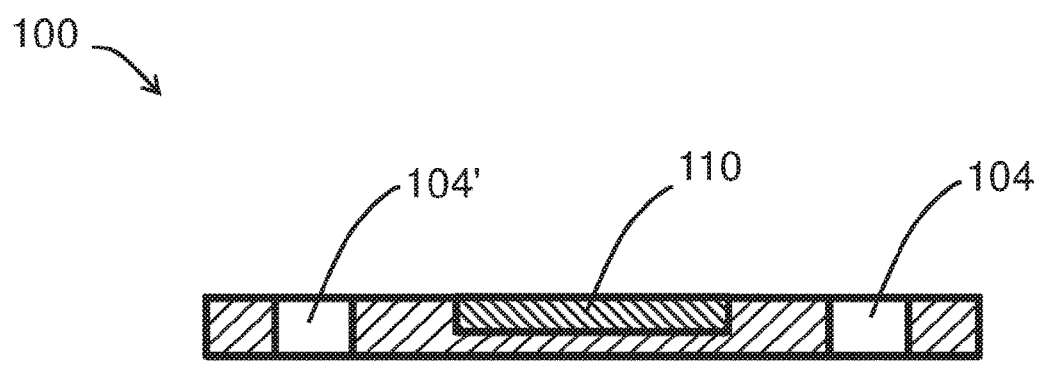
FIG. 20 shows a cross-sectional (Sec. D-D) front elevation view of another example of a magnetic positioning tool, according to the present invention.

FIG. 19 shows a top plan view of another example of a magnetic positioning tool 100, according to the present invention. In this example, there is no recessed portion 82, as there was in the previous example (i.e., the cross-section has a constant thickness, as can be seen in FIG. 20). Body 106 can have rounded corners 108 and 108'; or the corners can be square with a sharp 90° corner; or the corners can have a small-radius corner with a chamfer. Body 106 comprises a rectangular (linear) recess 102, which contains a rectangular-shaped magnet 110, that can be glued into place.

Note: this rectangular magnetic configuration mates with the rectangular magnetic configuration shown in FIG. 1B. Holes 104 and 104' are used in place of the U-shaped openings (slots) mentioned previously.

FIG. 20 shows a cross-sectional (Sec. D-D) front elevation view of another example of a magnetic positioning tool, according to the present invention, with the holes 104 and 104' and the rectangular-shaped magnet 110 of the tool 100 being indicated.

Figure 21A:
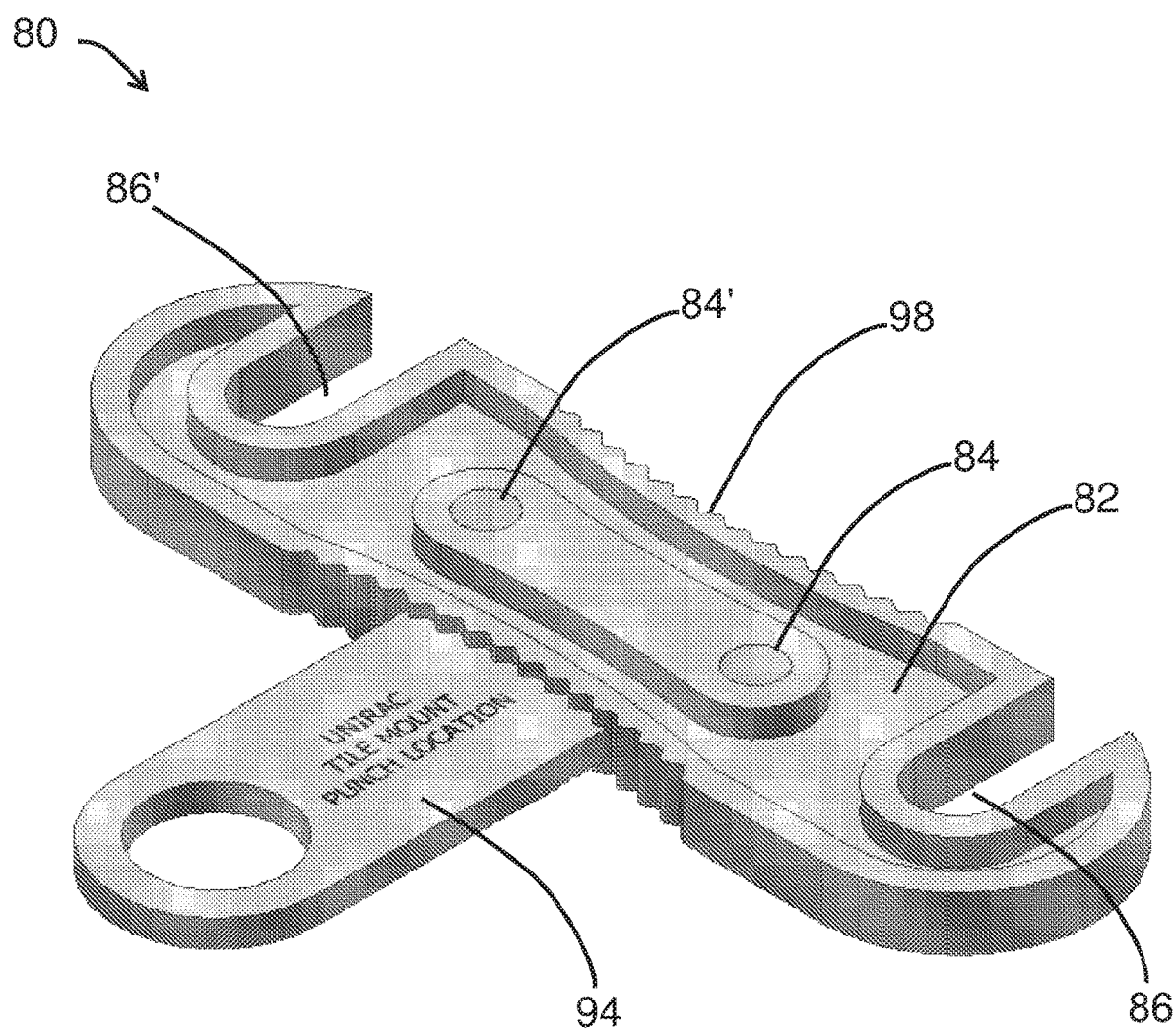
FIG. 21A shows a shaded perspective view of an example of a magnetic positioning tool, according to the present invention.

FIG. 21A shows a shaded perspective view of an example of a magnetic positioning tool, according to the present invention. Elements indicated in FIG. 21A are discussed above in connection with FIGS. 15 and 16.

Figure 21B:
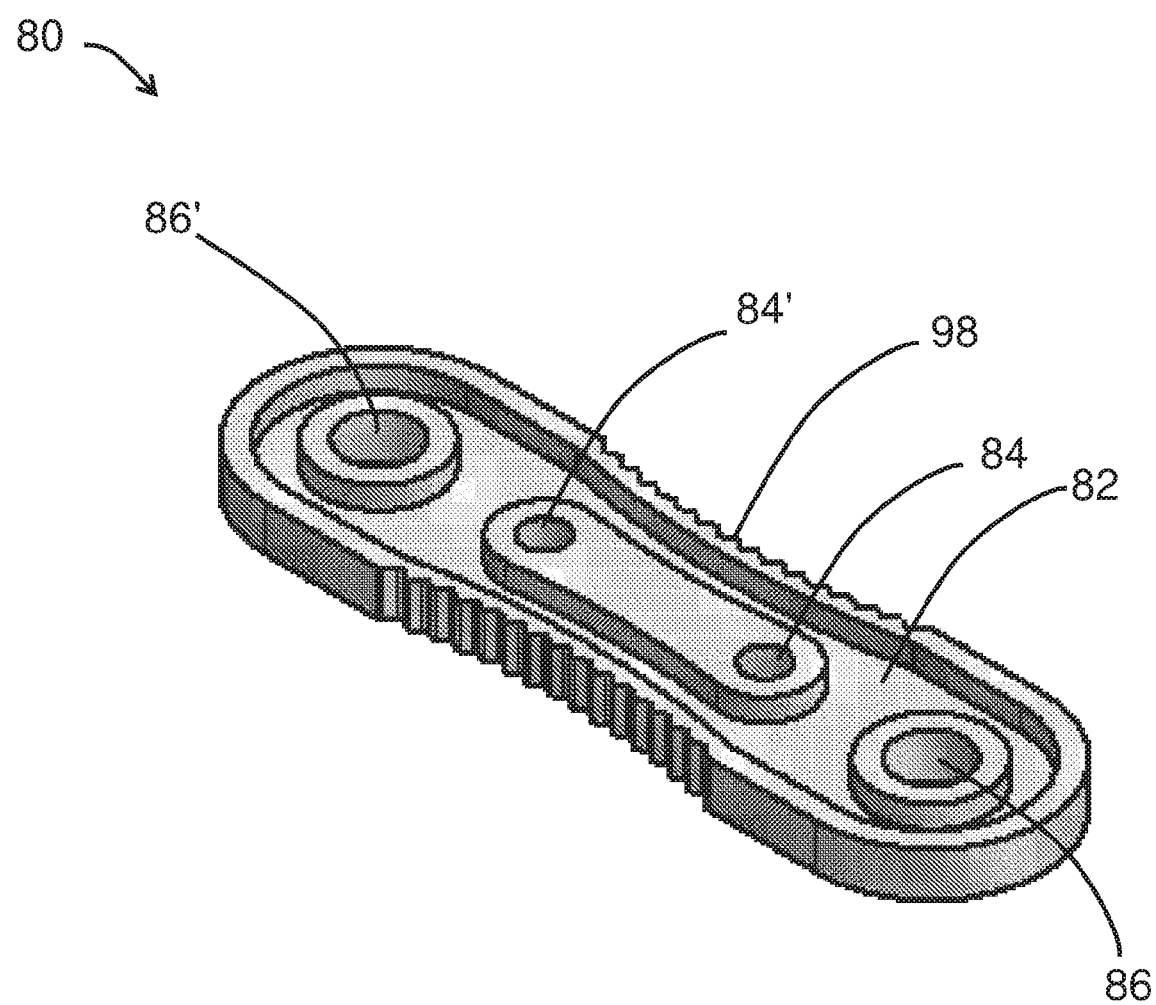
FIG. 21B shows a shaded perspective view of another example of a magnetic positioning tool, according to the present invention.

FIG. 21B shows a shaded perspective view of another example of a magnetic positioning tool, according to the present invention. This example is essentially the same as that shown in FIGS. 15 and 16, except that the example shown in FIG. 21B does not include any tab (handle) 94, and the openings 86 and 86' are configured as holes rather than slots.

Regarding the design of magnetic positioning tools 80, in general, it is not essential that all of the complementary (matching) pairs of items 84 and 70, and items 84' and 70' all be magnets (they can be, but it is not necessary). The term "magnetic means" means that is sufficient that only ½ of each pair be magnetic; whereas the remaining (complementary, matching) part can be ferrous/ferritic iron-based material or be magnetic. What is important is that at least one item of the complementary pair be magnetic; the other item can either be ferrous/ferritic iron based material (e.g., wrought steel), or be magnetic. Both combinations are attracted to each other, which satisfies the necessary condition of being magnetically attractive to each other. Specifically, item pairs 84 and 70 can be: (a) both magnets, (b) item 84 be magnetic and item 70 be ferrous/ferritic iron-based material or (c) item 84 be ferrous/ferritic iron-based material and item 70 be magnetic. The same combinations hold true for the other pair of items (84' and 70').

Figure 22:
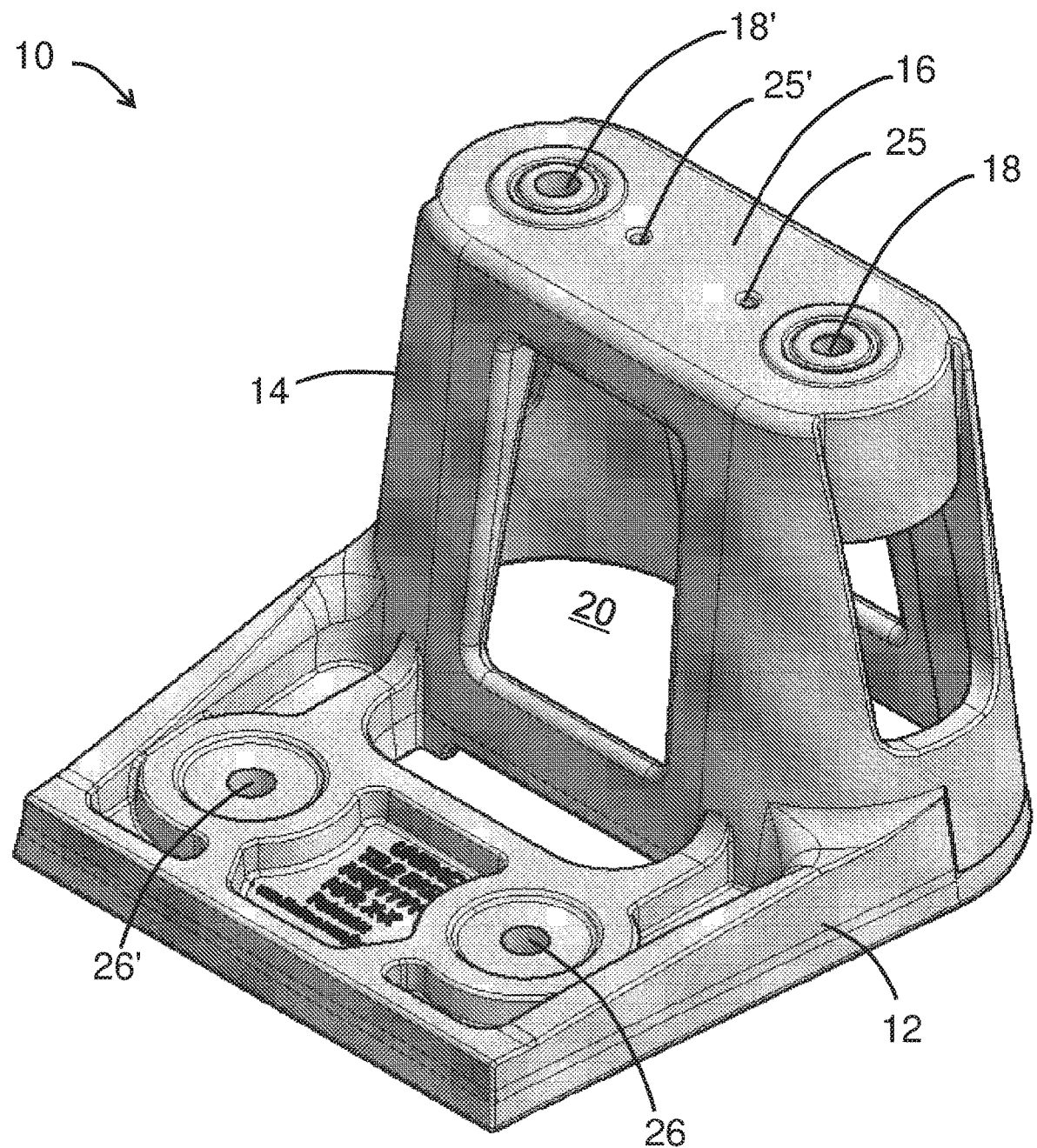
FIG. 22 shows a shaded perspective view of an example of a tile mount, according to the present invention.

FIG. 22 shows a shaded perspective view of an example of a tile mount 10, according to the present invention. Elements of the tile mount 10 indicated in FIG. 22 are discussed previously.

Figure 23:
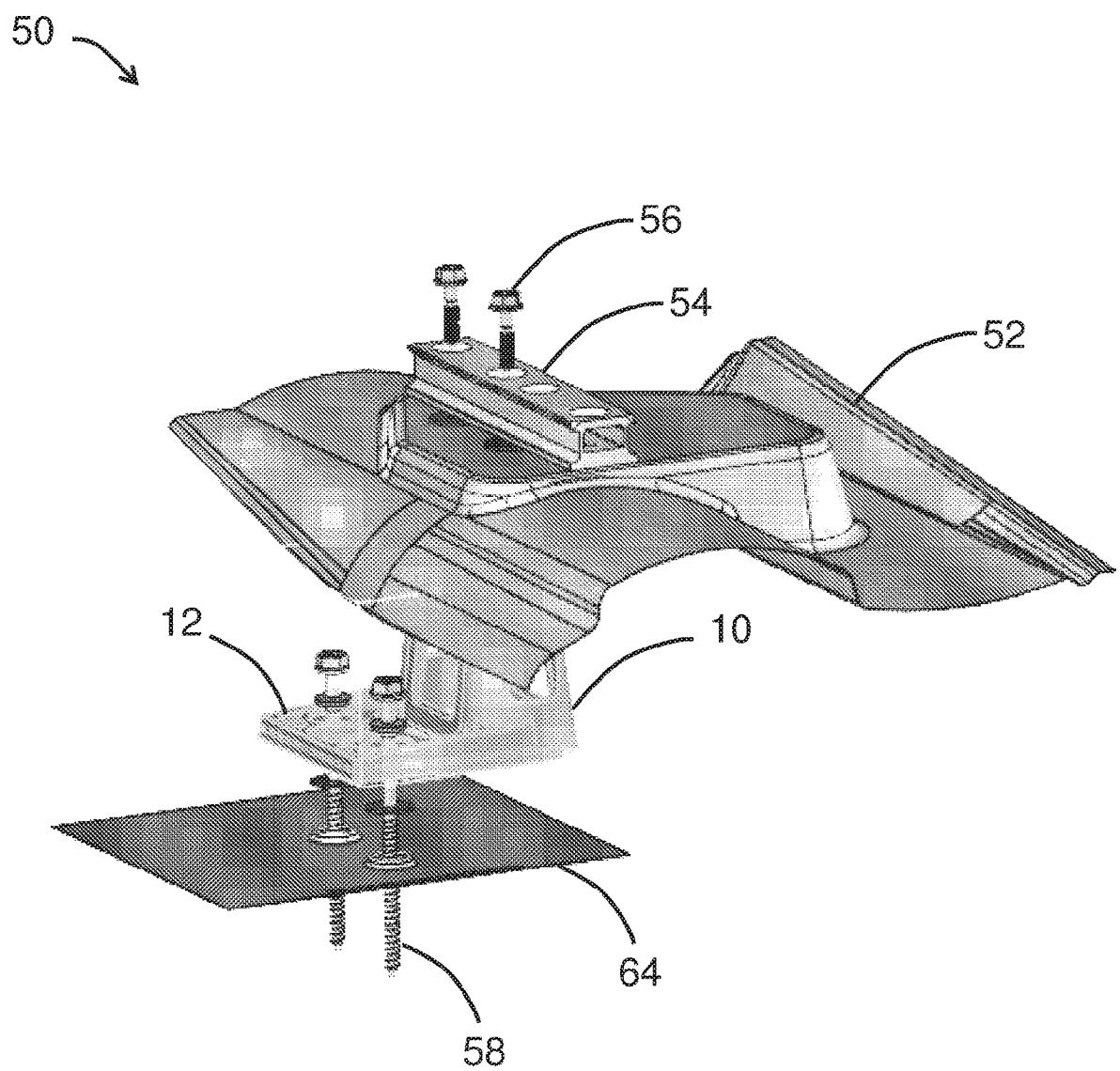
FIG. 23 shows a shaded perspective view of an example of a replacement tile solar mount assembly, according to the present invention.

FIG. 23 shows a shaded perspective view of an example of a replacement tile solar mount assembly 50, according to the present invention. Elements of the assembly shown in FIG. 23 are discussed previously in connection with FIGS. 9-14.

Figure 24:
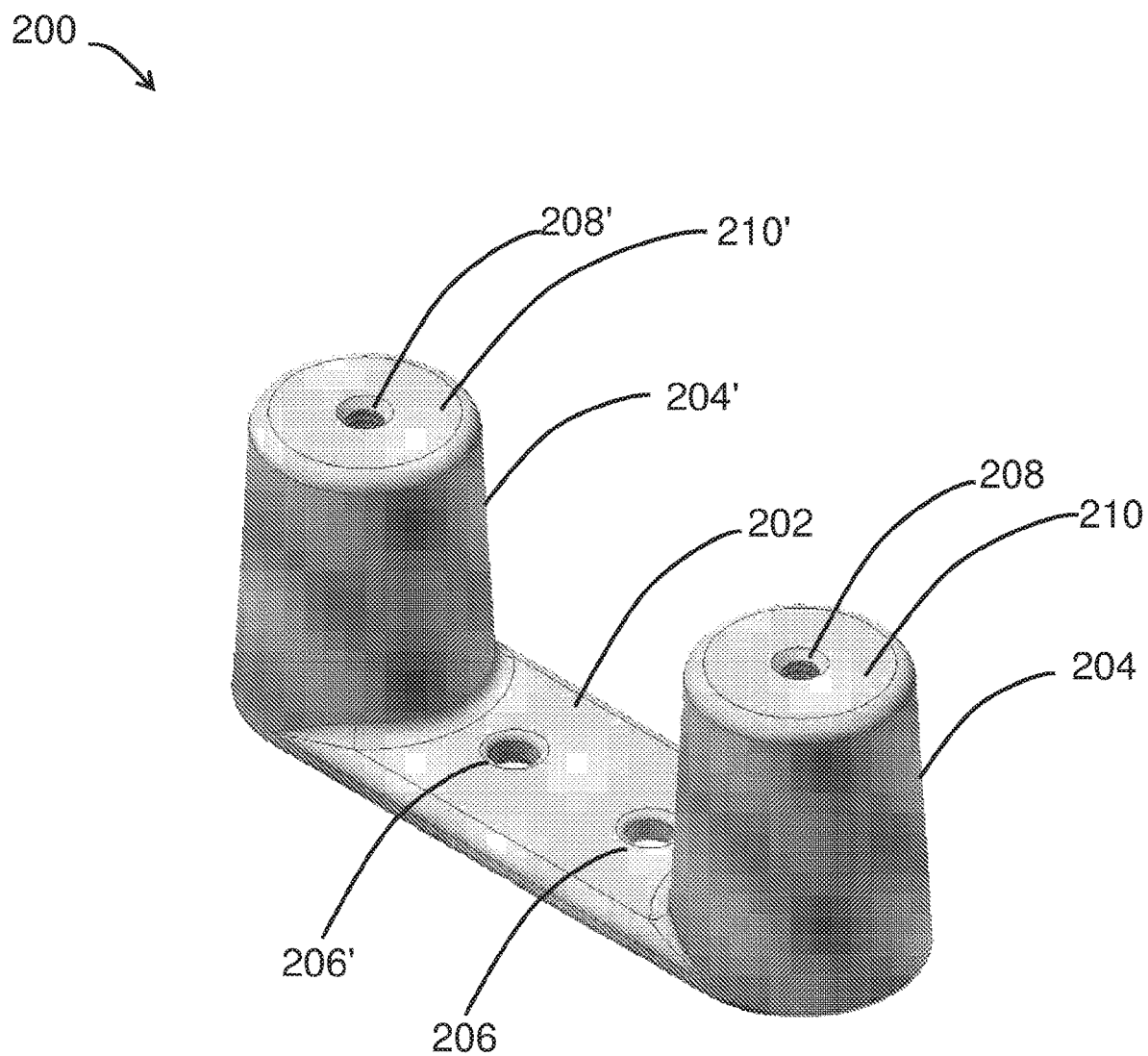
FIG. 24 shows a shaded perspective view of another example of a tile mount, according to the present invention.

FIG. 24 shows a shaded perspective view of another example of a tile mount, according to the present invention. In this example, tile mount 200 comprises a base strip 202 with two vertically-oriented, integral, monolithic posts 204 and 204' with central holes 208 and 208', respectively, for mounting a lateral support bar thereto (not shown). Holes 208 and 208' can be smooth (for use with self-tapping screws) or holes 208 and 208' can be threaded (for use with threaded machine screws). Base strip 202 can have a pair of through-holes 206 and 206', which can receive lag screws for mounting the tile mount to a roof. The posts 204 and 204' can be hollow, and can have tapered sidewalls, which permits multiple tile mounts to be stacked on top of one another in a compact configuration, which makes shipping easier. Posts 204 and 204' can have a flat upper platform 210 and 210', respectively.

Figure 25:
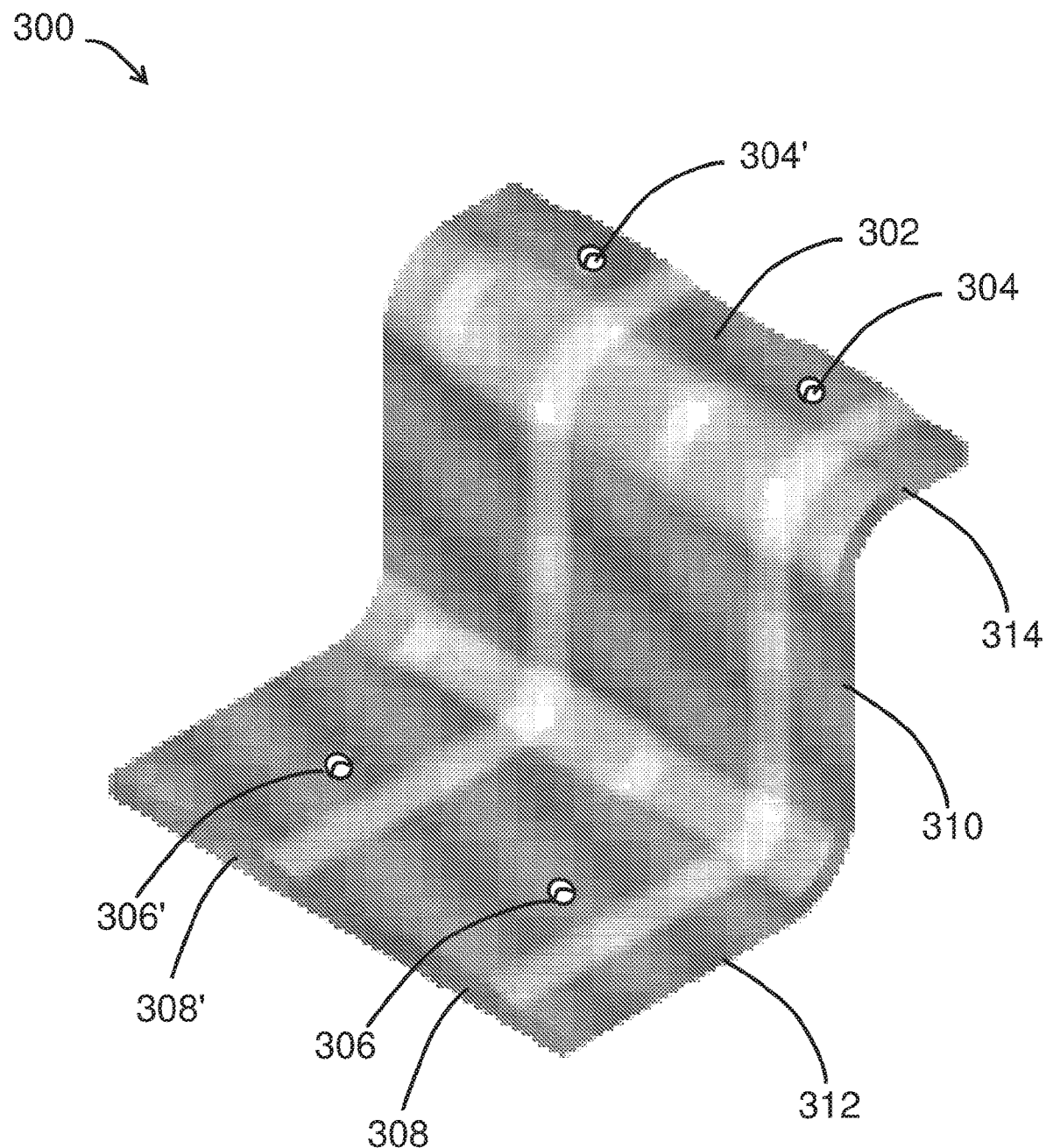
FIG. 25 shows a shaded perspective view of another example of a tile mount, according to the present invention.

FIG. 25 shows a shaded perspective view of another example of a tile mount, according to the present invention. In this example, tile mount 300 comprises a single-piece, integral, monolithic strip 302 of metal (or plastic or fiber-reinforced polymer) that is S-shaped, with a flat base 312, a vertical riser section 310, and a flat upper platform 314. Disposed on upper platform are a pair of through-holes 304 and 304' for mounting a lateral attachment bar thereto (not shown), and disposed on base 312 are a pair of through-holes 306 and 306', which can receive lag screws for mounting tile mount 300 to a roof. Tile mount 300 can have a thicker cross-sectional area 308 and 308', in the region of holes 304, 304', 306, and 306', to increase bending strength of the strip.

Figure 26:
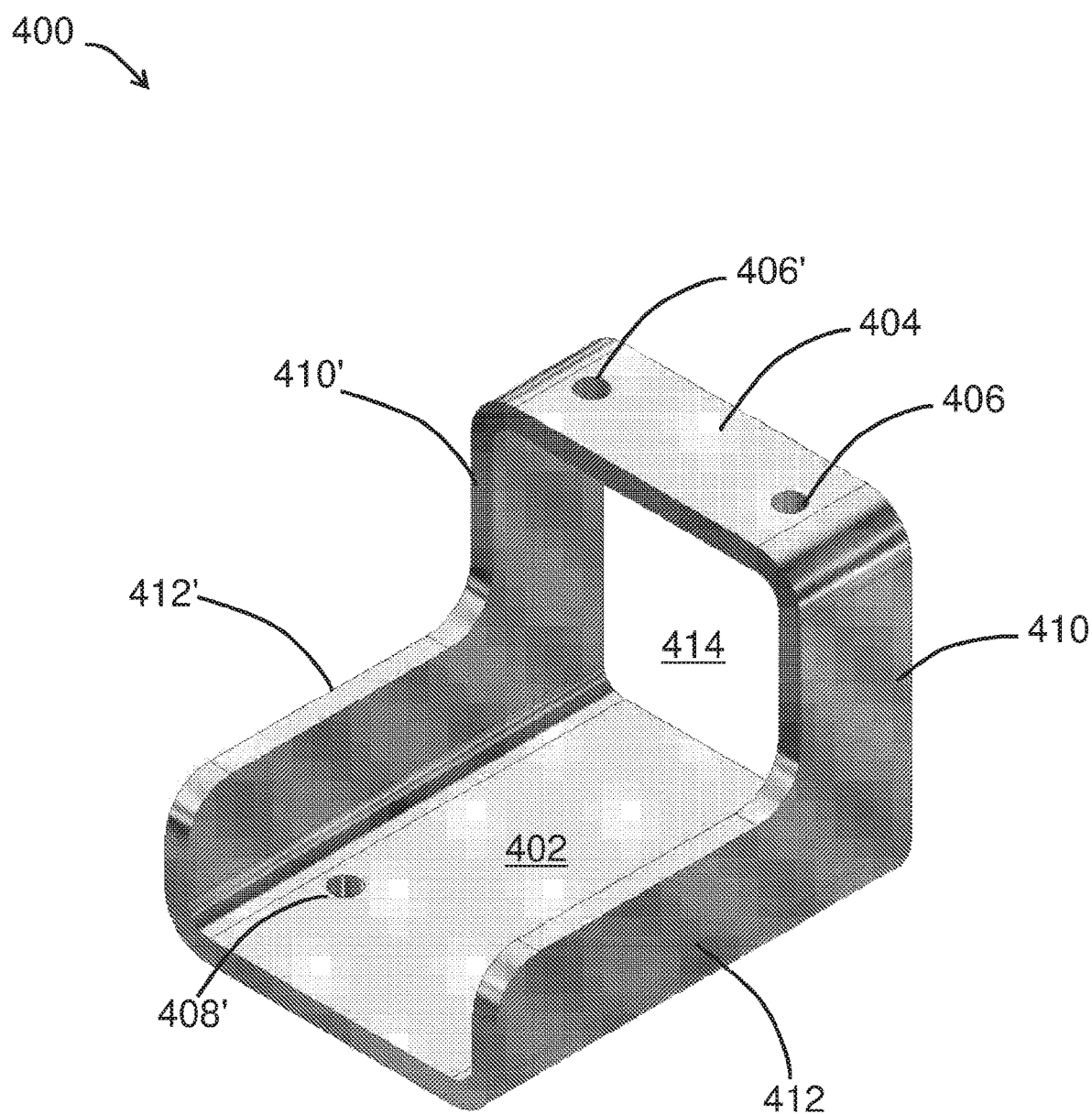
FIG. 26 shows a shaded perspective view of another example of a tile mount, according to the present invention.

FIG. 26 shows a shaded perspective view of another example of a tile mount, according to the present invention. In this example, tile mount 400 comprises a rectangular channel that has had a section removed (for example, by wire electro-discharge-machining, EDM, or by band-saw cutting, an extruded channel). Thus, tile mount 400 comprises a base section 402 joined to a pair of side walls 412 and 412', which are joined to a pair of vertical riser sections 410 and 410', respectively. Vertical riser sections 410 and 412 are joined together across the top by a flat platform section 404. A pair of through-holes 406 and 406' are disposed in the upper platform 404, for attaching a lateral attachment bar (not shown). A pair of through-holes, one such through hole 408' being shown in FIG. 26, are disposed in the base 402 for attaching tile mount 400 to a roof with lag screws. Tile mount 400 can be made of extruded steel, aluminum, aluminum alloy, or zinc alloy. Tile mount 400 has an open (hollow) rectangular-shaped central section 414.

Figure 27:
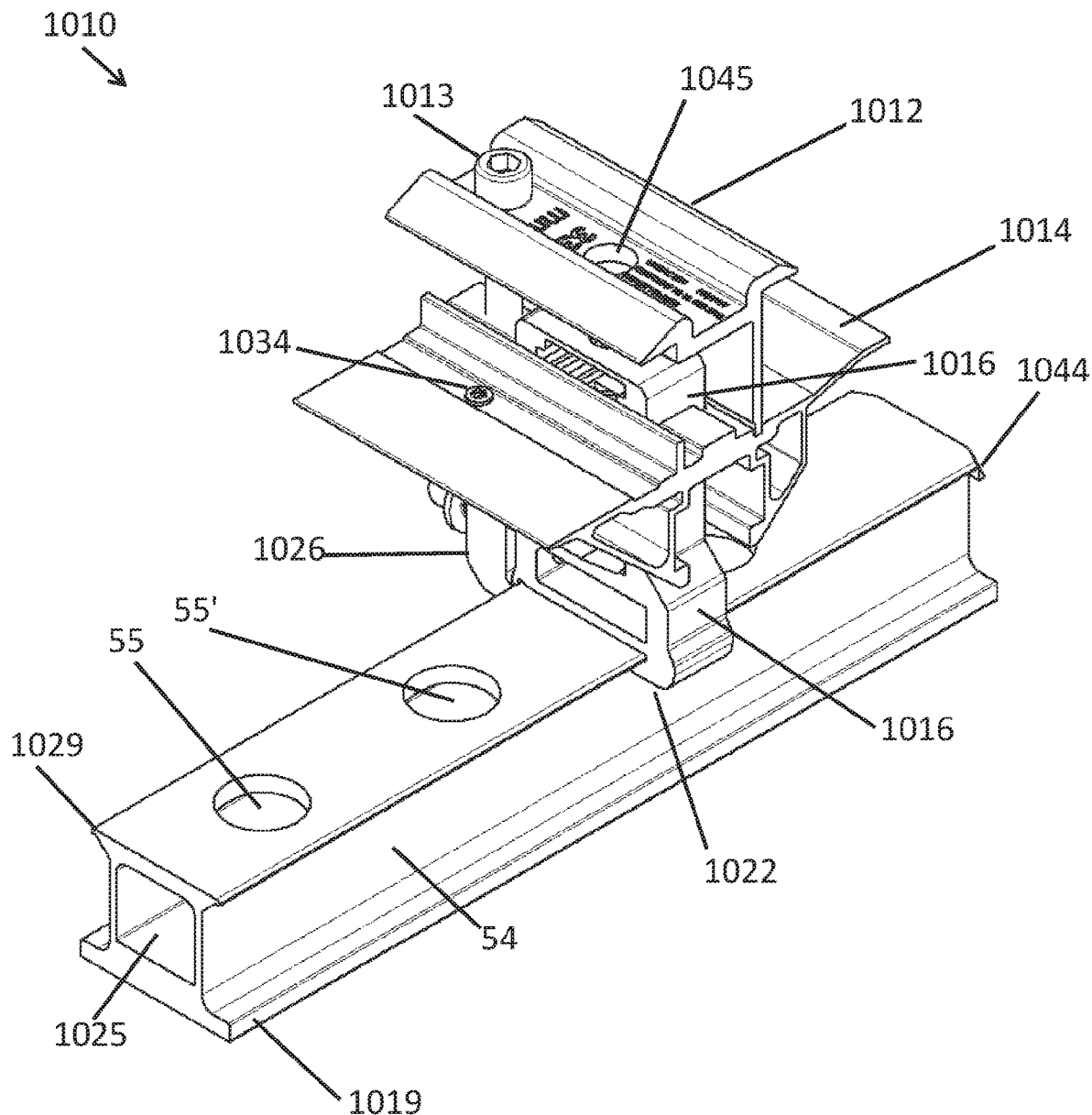
FIG. 27 shows a perspective view of an example of a lateral attachment bar with a solar mount mechanism attached to the attachment bar by a click-on tower assembly, according to the present invention.

FIG. 27 shows a perspective view of an example of a click-on tower sub-assembly 1010 attached to lateral attachment bar 54, with a height-adjustable, rail-less solar panel mounting assembly 1012, including an access opening 1045, mounted on tower 1016, according to the present invention. Lateral attachment bar 54 comprises a plurality of access holes 55, 55, etc. for inserting a plurality of screws (not shown), as well as a base 1019, a top 1029, sides 1022, and a hollow central void 1025. Lateral attachment bar 54 also comprises one or two deformed (turned-down) corner(s) 1044 at one, or both, ends of bar 54 to prevent the clicked-on tower sub-assembly 1010 from accidently sliding off the end of bar 54 during installation. Grounding pin 1034 can be seen in FIG. 27. Also visible in FIG. 27 are a fastener 1023, a lower bracket 1014, a fixed-height tower (stanchion) 1016, and a clamp 1026.

Figure 28:
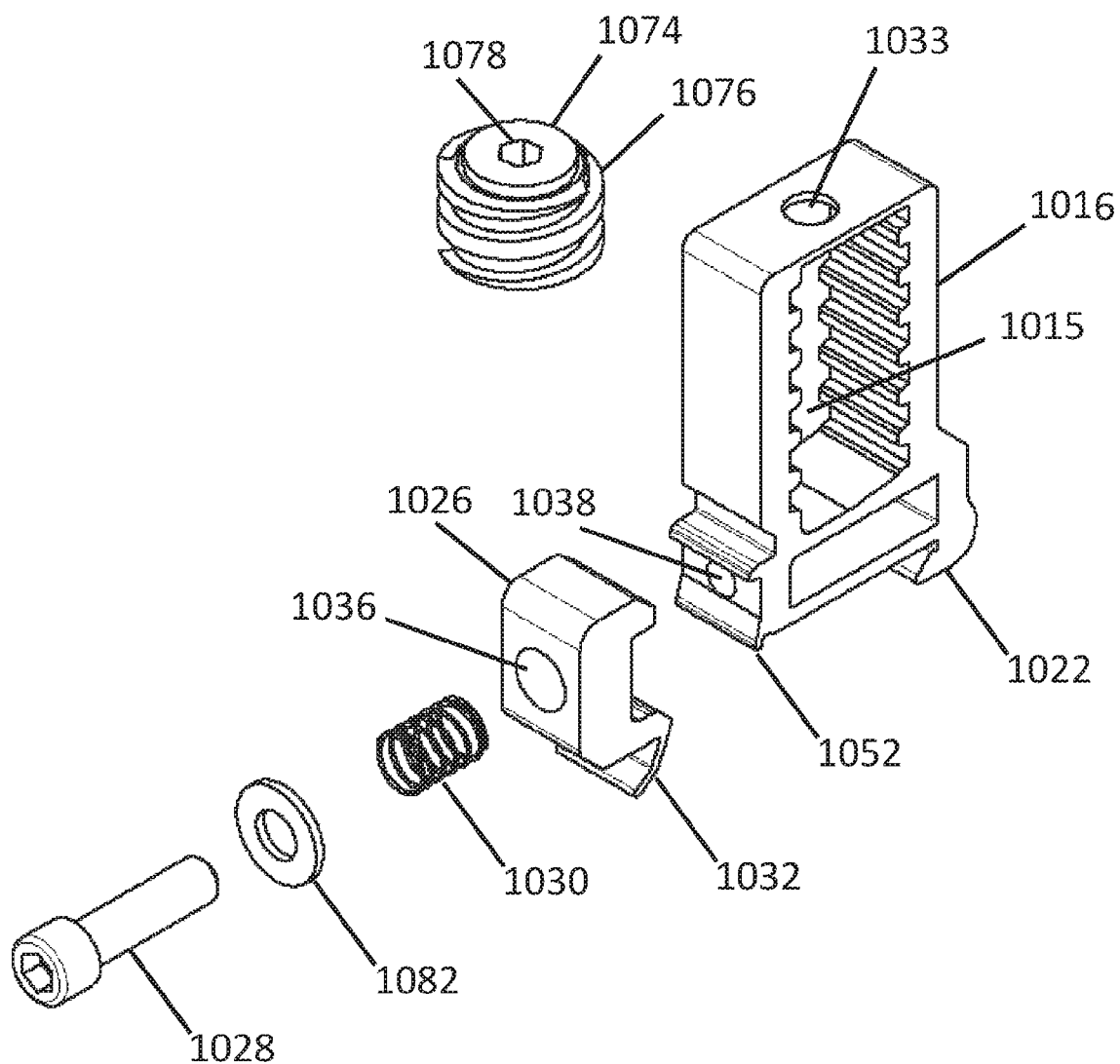
FIG. 28 shows a perspective exploded view of an example of a click-on tower assembly, according to the present invention.

FIG. 28 shows a perspective exploded view of an example of a click-on tower sub-assembly 1010 (FIG. 27) according to the present invention. The tower/clamp subassembly comprises clamp fastener 1028, flat washer 1082, spring 1030, clamp 1026, and tower 1016. Helical drive 1074 is inserted inside of tower 1016 into open volume 1015, and comprises helical threads 1076 and axially-aligned hexagonal socket 1078. Access hole 1033 in the top of tower 1016 aligns with hexagonal socket 1078, and provides access for an Allen wrench to rotate helical drive 1074. The clamp fastener 1028 has a shank that can pass through the flat washer 1082, the spring 1030, and an opening 1036 in the clamp 1026 to a receptacle 1038 in the tower 1016, where it can be connected by threads on the shank or by a screw or other fastener received by the shank to the tower 1016. Projections or flanges 1022 and 1052 are used to position and secure the tower 1016 on the lateral attachment bar 54 (FIG. 27).

Figure 29:
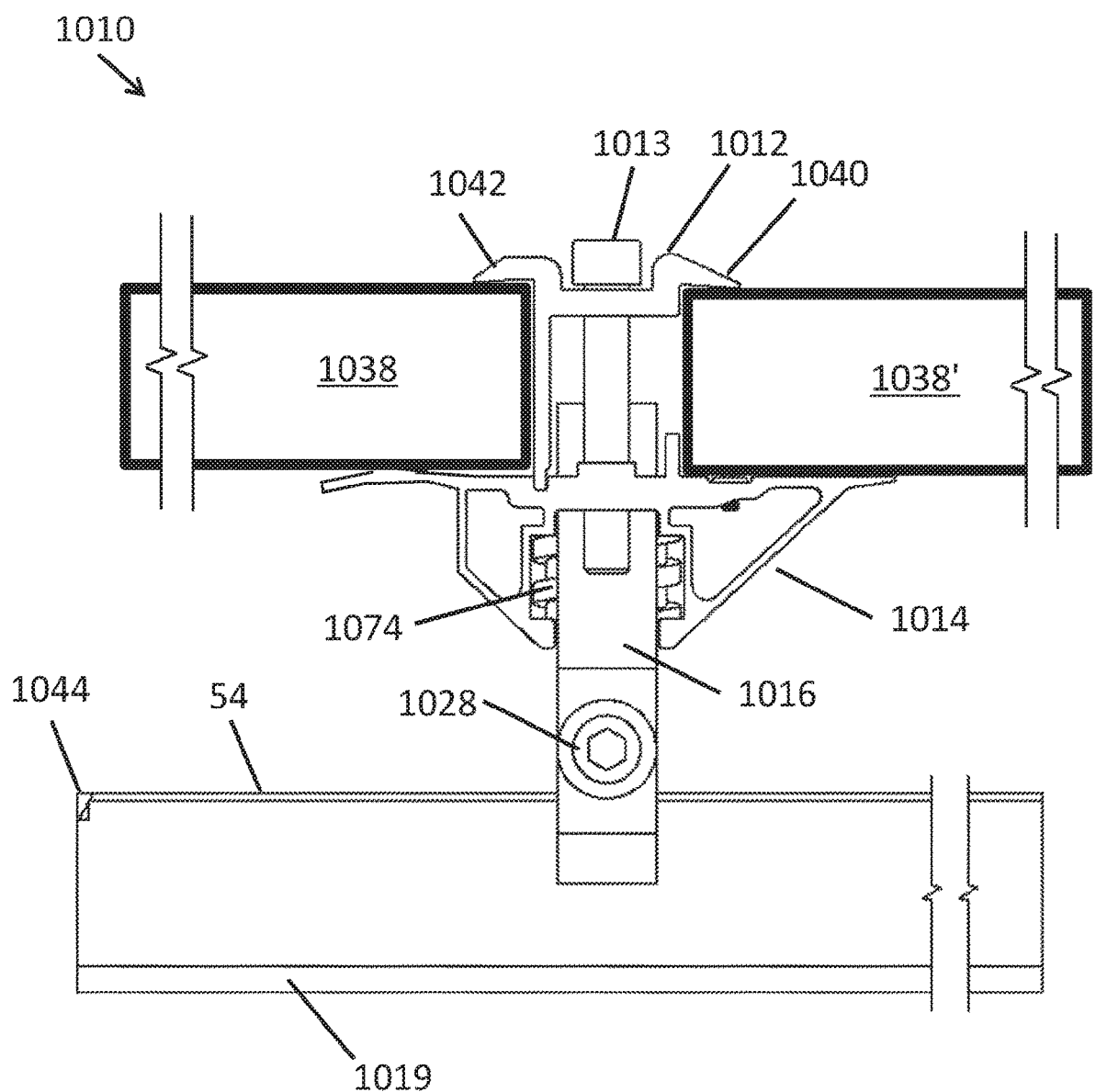
FIG. 29 shows a side elevation view of an example of a lateral attachment bar with a solar mount mechanism and mounted solar panels, attached to the attachment bar by a click-on tower assembly, according to the present invention.

FIG. 29 shows a side elevation view of an example of a lateral attachment bar with a solar mount mechanism and mounted solar panels, attached to the attachment bar by a click-on tower assembly, according to the present invention. Click-on tower sub-assembly 1010 is attached to a lateral attachment bar 54, with a height-adjustable, rail-less solar panel mounting assembly mounted on tower 1016. Two solar panels 1038 and 1038' are mounted in-between upper wings 1040 and 1042 of upper bracket 1012, and lower bracket 1014. Fastener 1013 clamps the solar panels tight. Rotation of helical drive 1074 moves the lower bracket 1014 up and down relative to fixed-height tower 1016 (stanchion). This adjustment can be made before, or after, the solar panels 1038, 1038' have been mounted in the sub-assembly 1010. The base 1019, one of the corners 1044, and the clamp fastener 1028 are also indicated in FIG. 29.

The click-on tower sub-assembly 1011 and height-adjustable, rail-less solar panel mounting assembly 1010 are described in more detail in U.S. patent application Ser. No. 15/138,018 filed Apr. 25, 2016, to Schuit et al., entitled "CLICK-ON TOWER FOR HEIGHT-ADJUSTABLE SOLAR PANEL MOUNTING ASSEMBLY", which is incorporated by reference herein in its entirety.

Figure 30A:
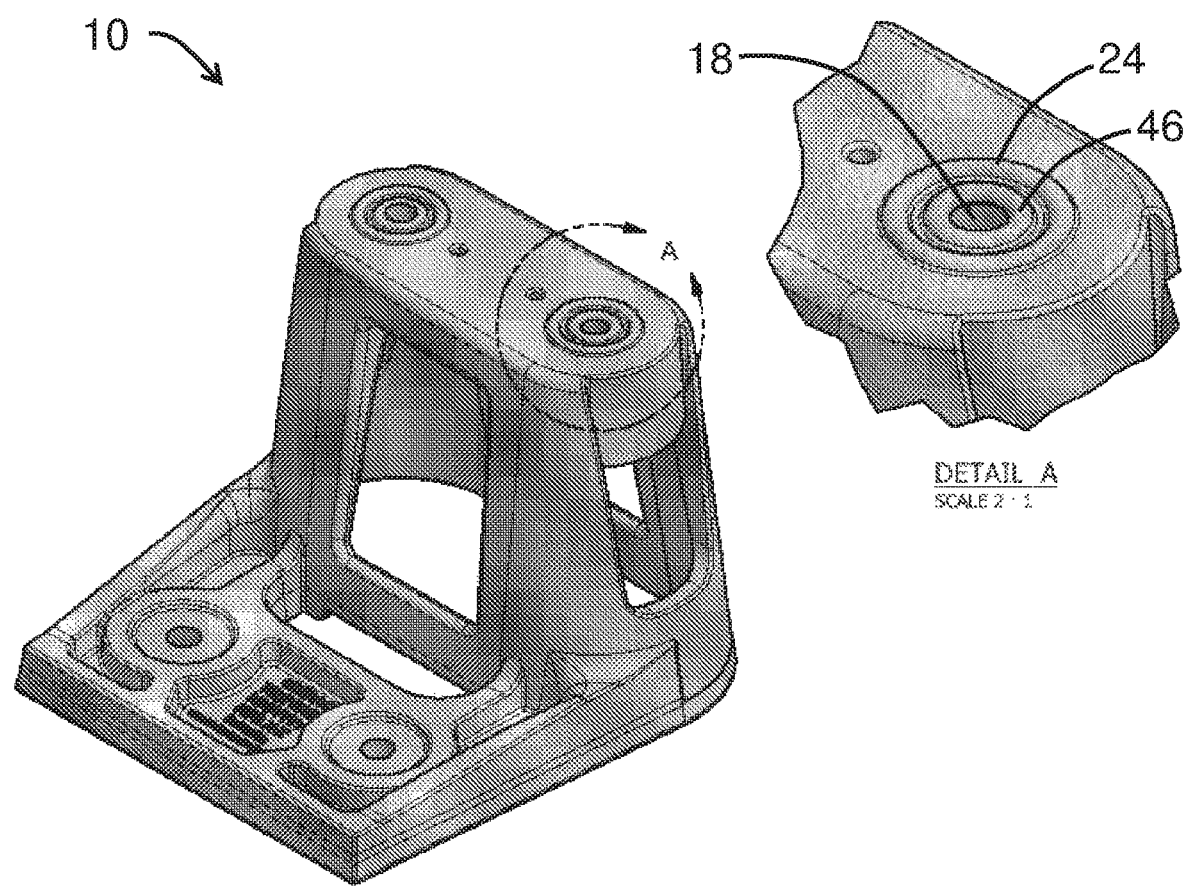
FIG. 30A shows a perspective view of an example of a tile mount, according to the present invention.

FIG. 30A shows a perspective view of an example of a tile mount 10, according to the present invention. Detail A of FIG. 30A provides an enlarged view of the circular rings 24 and 46 surrounding one of the mounting holes 18 in the tile mount 10 shown.

Figure 30B:
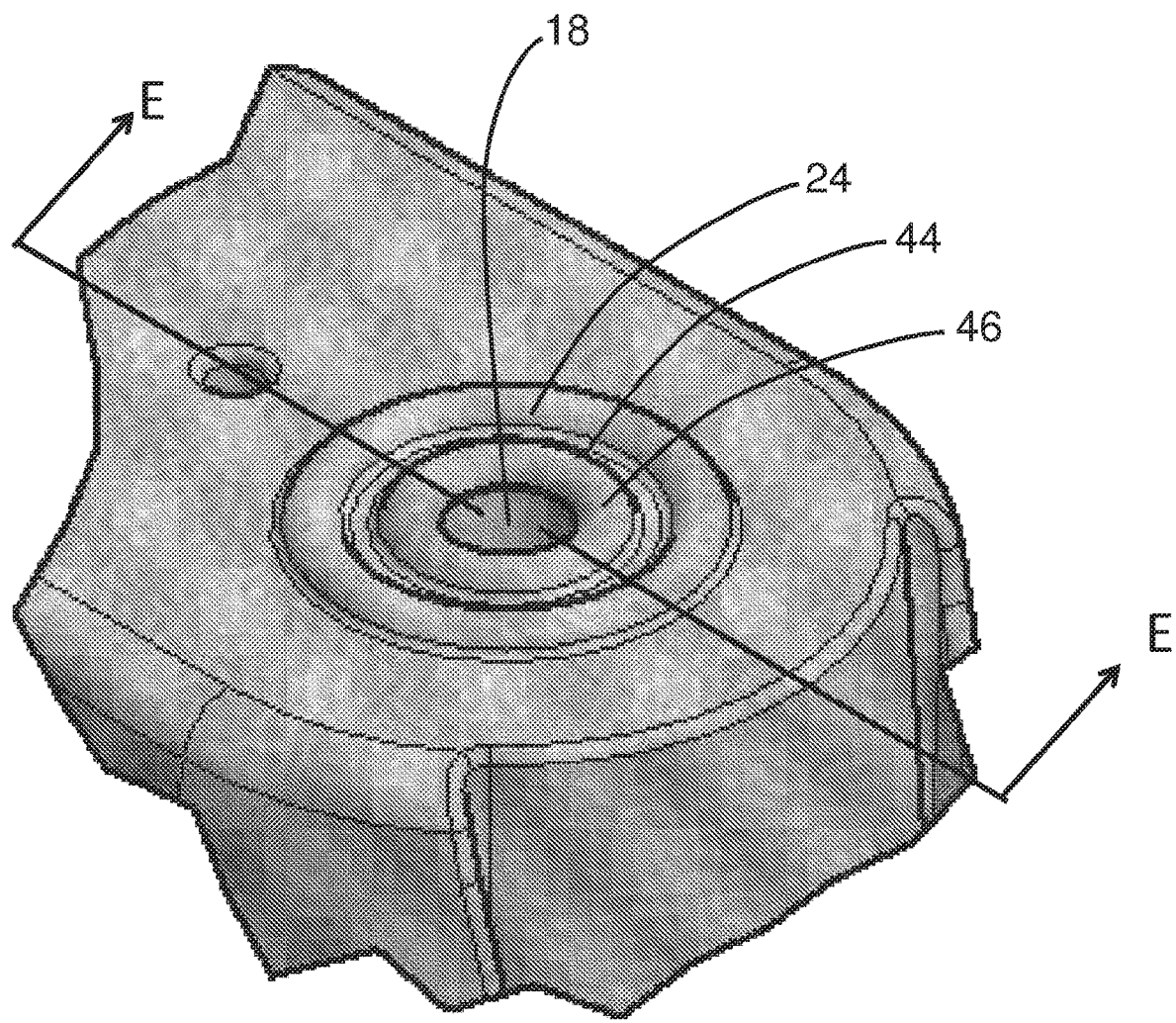
FIG. 30B shows a perspective close-up view of an example of tile mount sealing rings, according to the present invention.

FIG. 30B shows a perspective close-up view of an example of concentric tile mount sealing rings 24 and 46 surrounding a mounting hole 18, according to the present invention. The recessed groove 44 between the rings 24 and 46 is also indicated.

Figure 31:
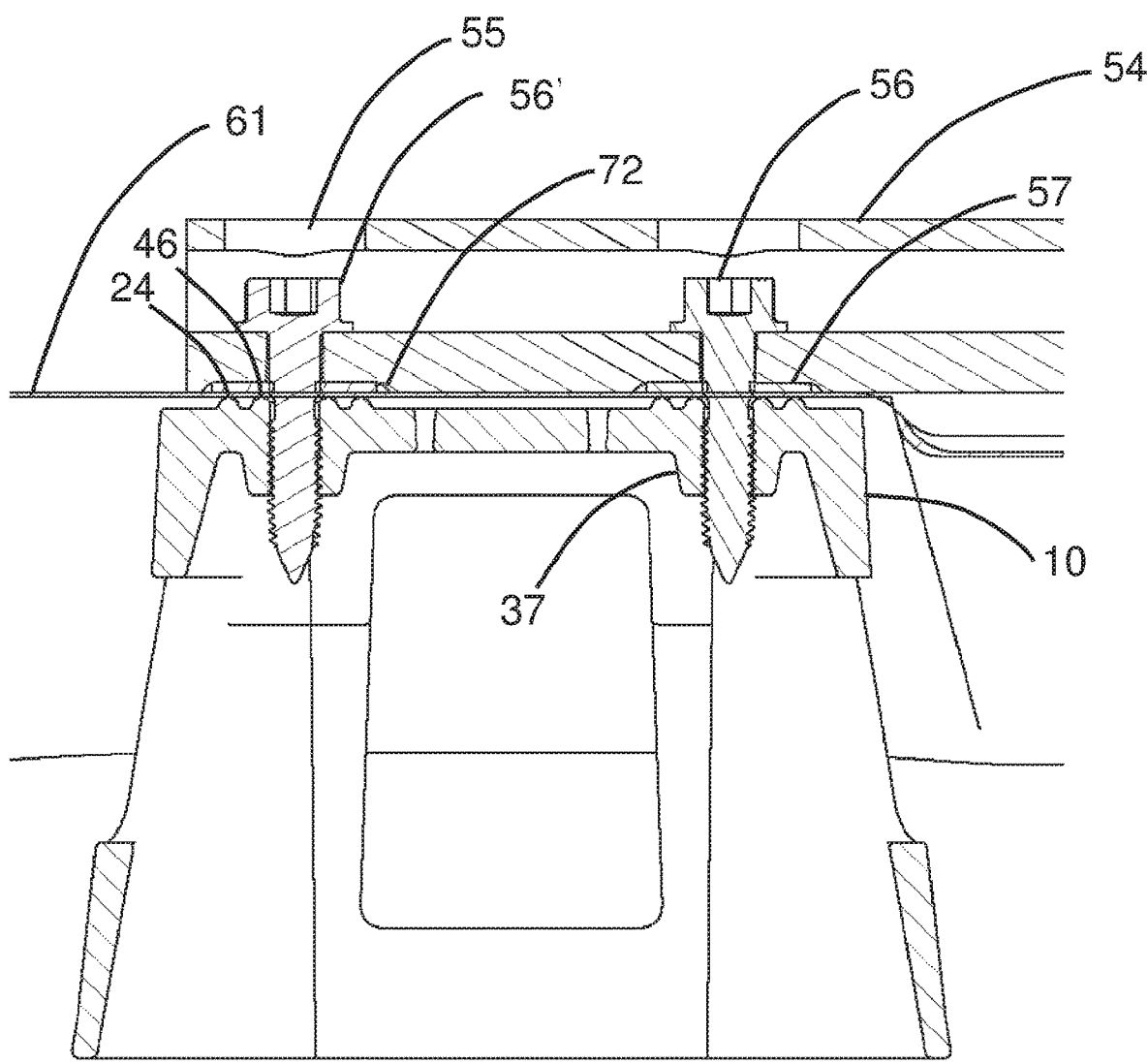
FIG. 31 shows a close-up cross-section view (SEC. E-E) of an example of a tile mount water sealing mechanism, according to the present invention.

FIG. 31 shows a close-up cross-section view (SEC. E-E in FIGS. 30B and 32) of an example of a tile mount sealing mechanism of the tile mount 10, according to the present invention. Flat washer 57 is disposed on top of inside sealing ring 46 and outside sealing ring 24. Washer 57 rests inside of counterbore 72 that is machined in the underside of the attachment bar or slider 54. Washer 57 can extend (protrude) up to 0.020 inches beyond the lower surface of the attachment bar or slider 54, so as to create an interference fit and guarantee positive contact between flat washer 57 and sealing rings 46 and 24 when compressed by self-tapping screws 56, 56', which guarantees a water-tight joint (seal). Soft, thin-walled flashing 61 deforms locally around the raised bumps of inner/outer seal rings 46 and 24 to make a 100% solid circumferential seal (at 2 places) under high local contact stress when flashing 61 is clamped in-between flat washer 57 and inner/outer seal rings 46 and 24, respectively. One boss 37 of the tile mount and one oversized through-hole 55 in the attachment bar or slider are also indicated.

Figure 32:
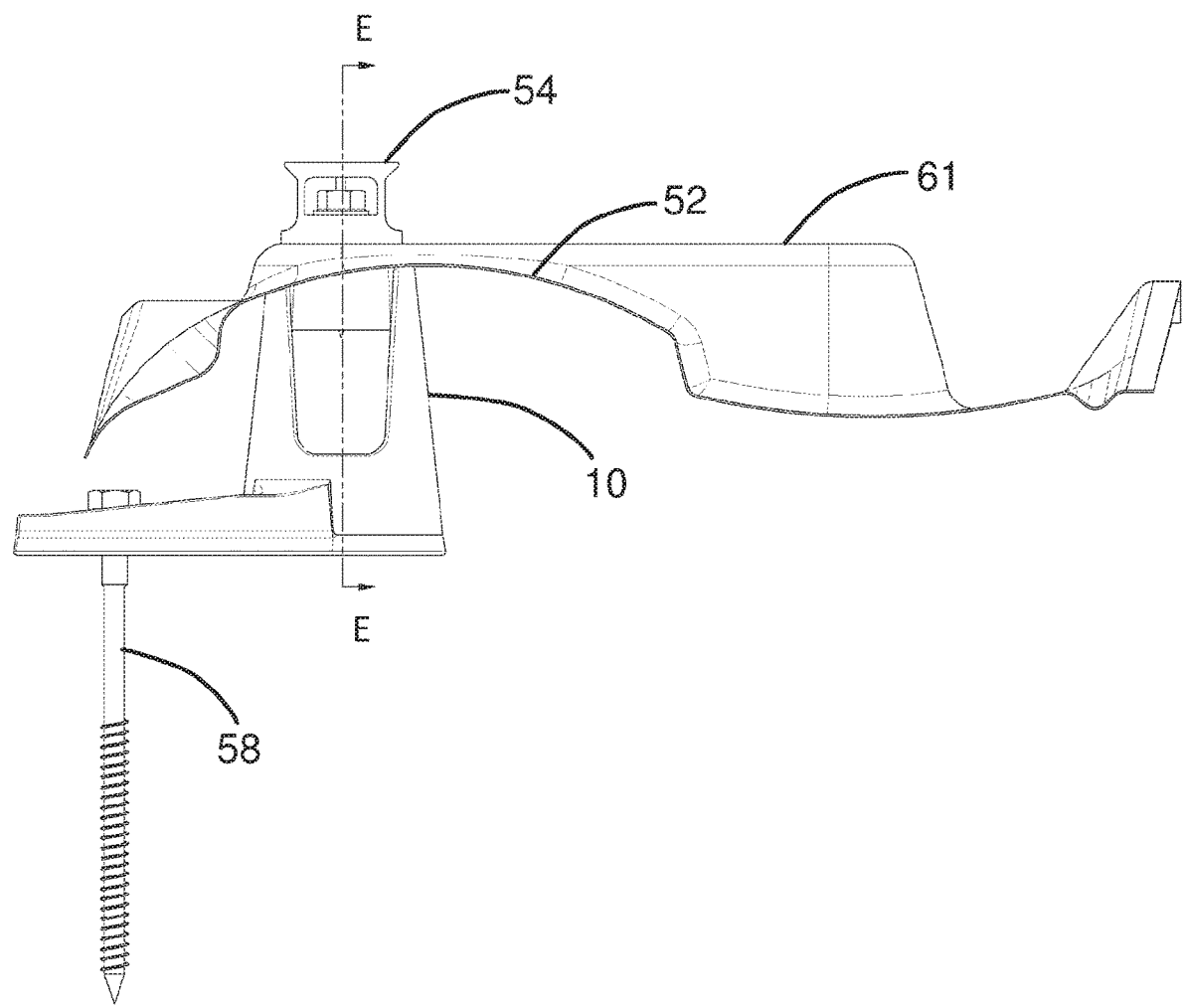
FIG. 32 shows a perspective view of an example of a tile mount assembly with a replacement tile, according to the present invention.

FIG. 32 shows a perspective view of an example of a tile mount assembly with a replacement tile, according to the present invention. Included in the mount assembly shown are the mount 10 itself, the replacement tile 52, the attachment bar or slider 54, and the flashing 61, as well as one lag screw 58.

In some embodiments, flat washer 57 is not used in the present invention.

In other embodiments of the present invention, tile mount 10 can comprise a single vertically-oriented mounting hole 18 disposed in the top platform 16 of riser 14. At the second location (i.e., 18'), a vertically-oriented locating pin (not illustrated) can be used in place of a second mounting hole 18'.

In other embodiments of the present invention, tile mount 10 can comprise a single, raised, sealing ring 24 (as opposed to a pair of concentric sealing rings 24 and 46).

Referring to FIGS. 9-14, in another embodiment of the present invention, replacement tile 52 can have a top section 61 that is made of a polymeric material that is sufficiently thin so that when placed on top of tile mount 10 that the installer's finger can palpate the thin membrane 61 and feel the raised (protruding) sealing rings 24 and 46 disposed underneath top section 61 and, hence, locate the center of the mounting holes 18, 18' (which are centered inside of sealing rings 24 and 46). Then, a hole can be made in the top section/membrane 61 with a punch or other sharp tool, thereby aligning the freshly-made hole with the underlying mounting holes 18, 18'. This alternate method eliminates the need to use a magnetic positioning tool to locate the centers of underlying mounting holes 18, 18'.

Figure 33:
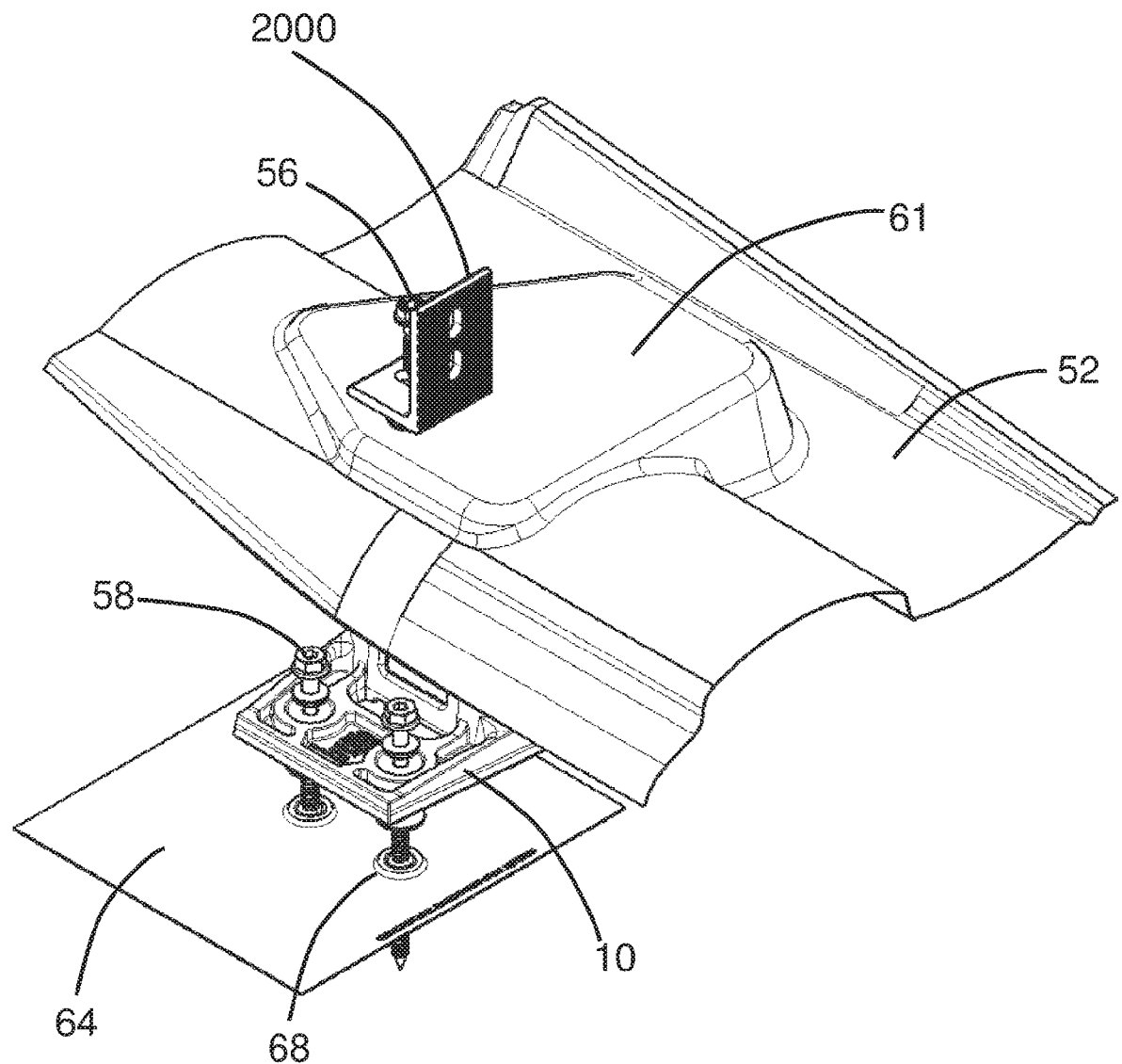
FIG. 33 shows a perspective view of another example of a tile mount assembly with replacement tile and L-foot, according to the present invention.

FIG. 33 shows a perspective view of another example of a tile mount assembly with replacement tile 52 and L-foot 2000, according to the present invention. L-foot 2000 replaces the lateral attachment bar 54 previously discussed, and is attached with a single fastener 56, which can be a self-tapping screw or a nut and bolt combination. L-foot 2000 can be used to attach a structural rail in a rail-based system, or other mounting components, as necessary, for mounting solar panels, for example, to a roof. L-foot 2000 is an L-shaped extruded bracket comprising a horizontal base 2004 with a first aperture 2002 and a vertical riser 2006 with a second aperture 2008 or vertical U-shaped slot (illustrated in FIG. 34). Fastener 56 penetrates through top section 61 of replacement tile 52, and attaches to tile mount 10 disposed underneath tile 52. Tile mount 10 is attached to a roof surface (not illustrated) using at least one lag screw 58, which penetrates through flashing 64, and which has a raised sealing ring 68 disposed in the flashing 64.

Figure 34:
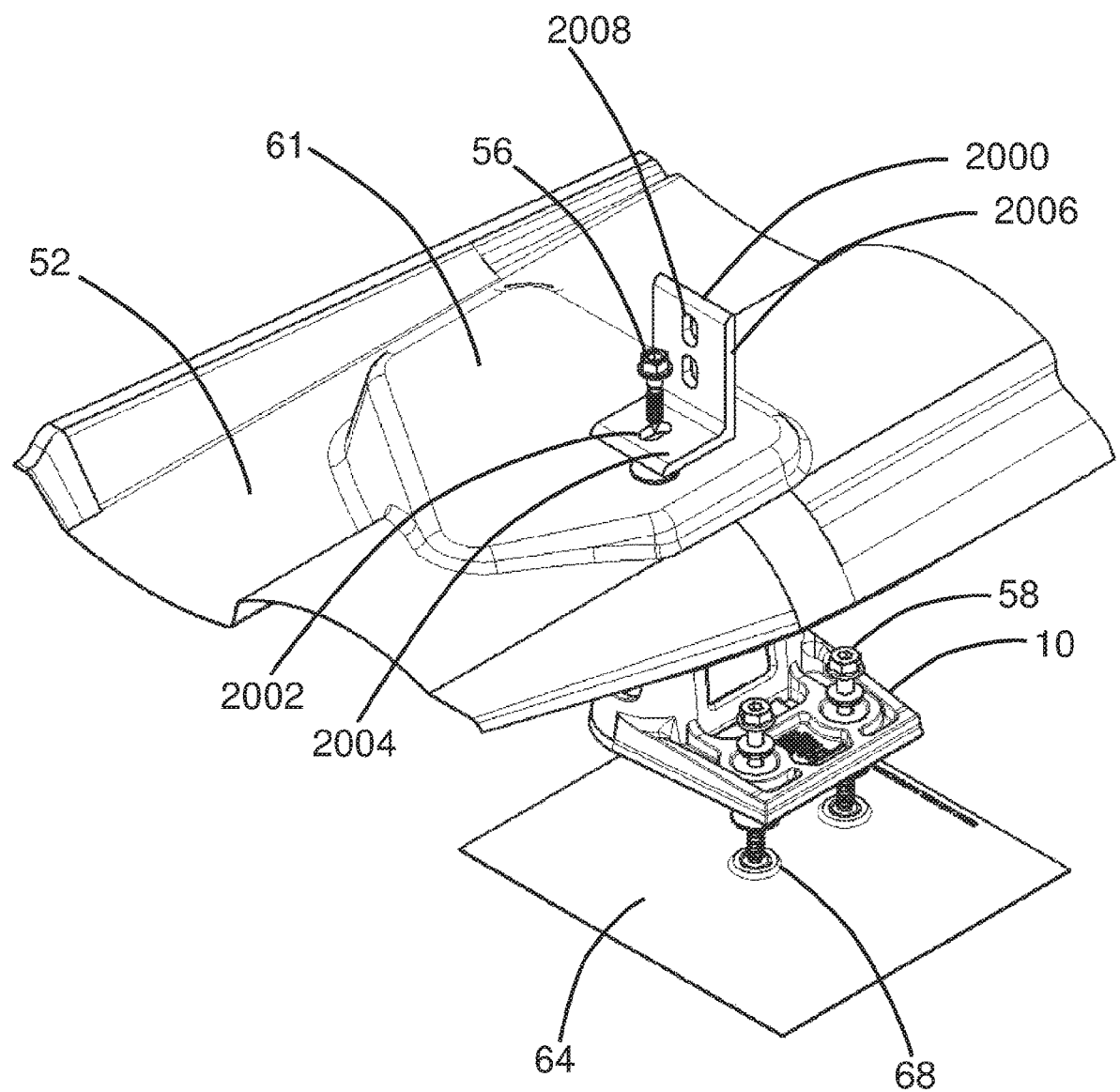
FIG. 34 shows a perspective view of another example of a tile mount assembly with replacement tile and L-foot, according to the present invention.

FIG. 34 shows a perspective view of another example of a tile mount assembly with replacement tile and L-foot, according to the present invention. The description of reference numbers is the same as in FIG. 33.

Figure 35:
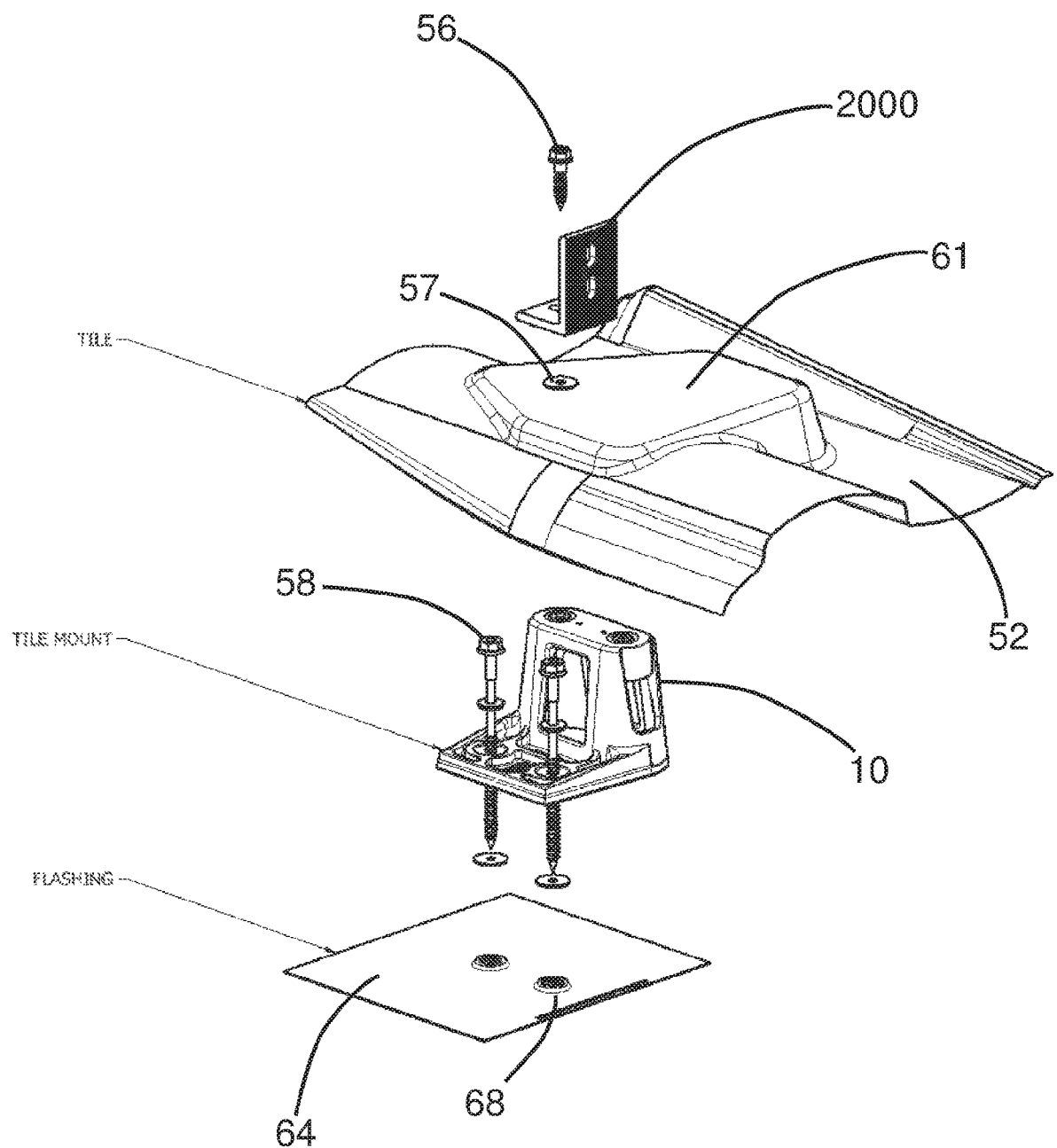
FIG. 35 shows a perspective view of another example of a tile mount assembly with replacement tile and L-foot, according to the present invention.

FIG. 35 shows a perspective view of another example of a tile mount assembly with replacement tile and L-foot, according to the present invention. The description of reference numbers is the same as in FIG. 33. Optional flat washer 57 can be used in-between L-foot 2000 and replacement tile 52.

Figure 36:
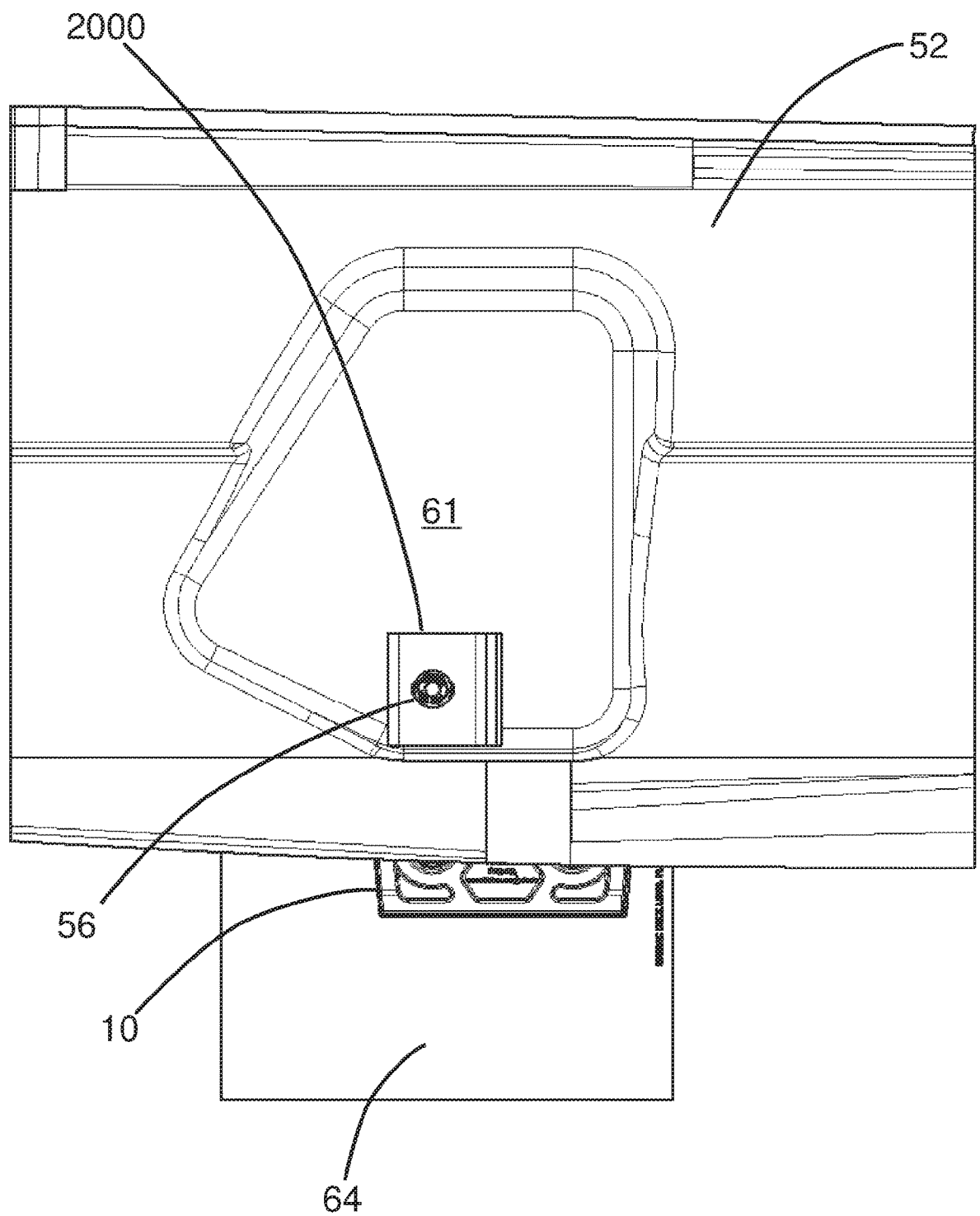
FIG. 36 shows a top plan view of another example of a tile mount assembly with replacement tile and L-foot, according to the present invention.

FIG. 36 shows a top plan view of another example of a tile mount assembly with replacement tile and L-foot, according to the present invention. The description of reference numbers is the same as in FIG. 33.

Figure 37:
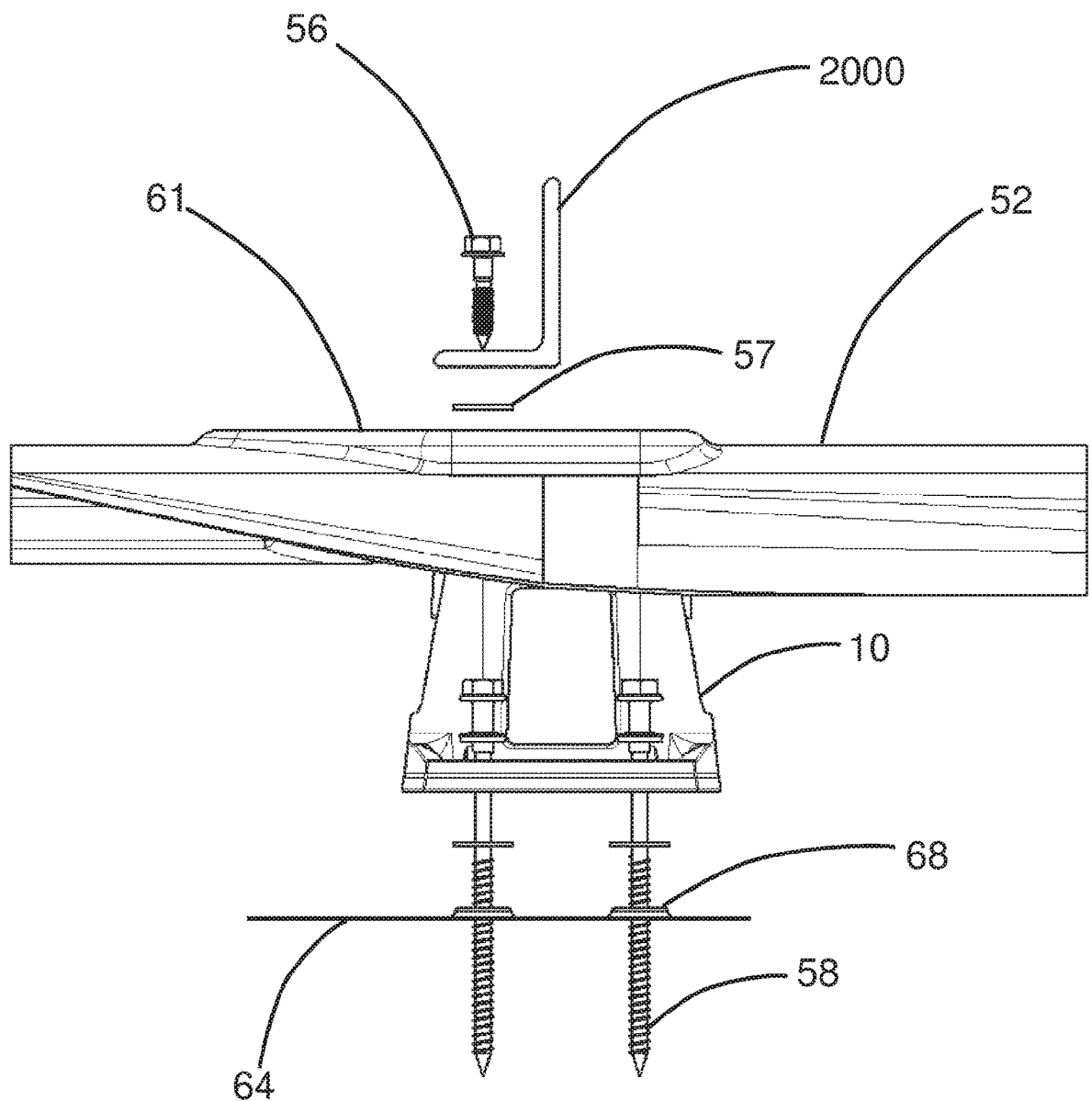
FIG. 37 shows a side elevation view of another example of a tile mount assembly with replacement tile and L-foot, according to the present invention.

FIG. 37 shows a side elevation view of another example of a tile mount assembly with replacement tile and L-foot, according to the present invention. The description of reference numbers is the same as in FIG. 33. Optional flat washer 57 can be used in-between L-foot 2000 and replacement tile 52.

Figure 38:
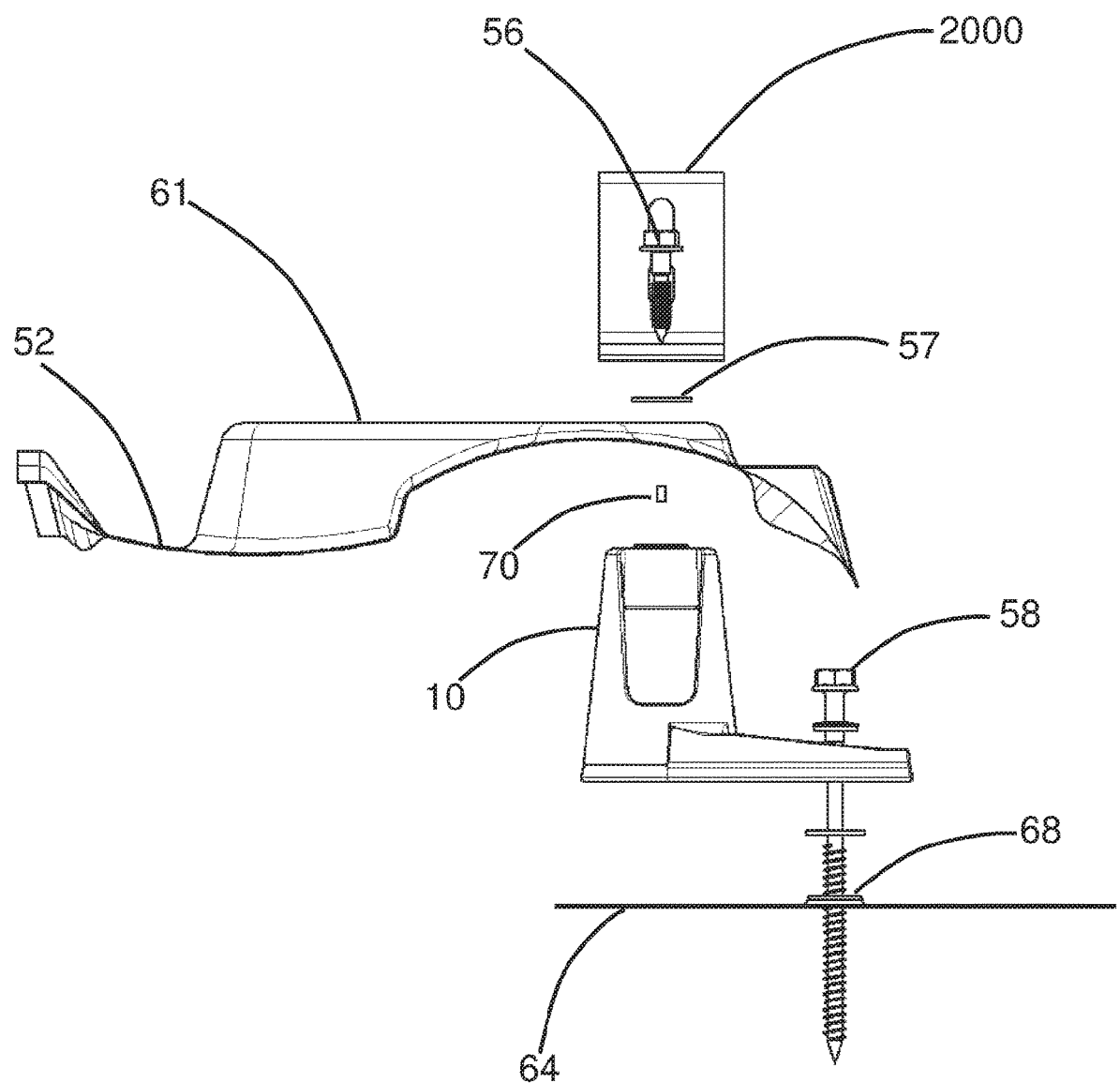
FIG. 38 shows a front elevation view of another example of a tile mount assembly with replacement tile and L-foot, according to the present invention.

FIG. 38 shows a front elevation view of another example of a tile mount assembly with replacement tile and L-foot, according to the present invention. The description of reference numbers is the same as in FIG. 33. Optional flat washer 57 can be used in-between L-foot 2000 and replacement tile 52. Locating/positioning magnet or ferrous insert 70 is shown in this figure. Optionally, a locating/positioning magnet or ferrous insert (not illustrated) can be disposed inside of L-foot 2000.

Figure 39:
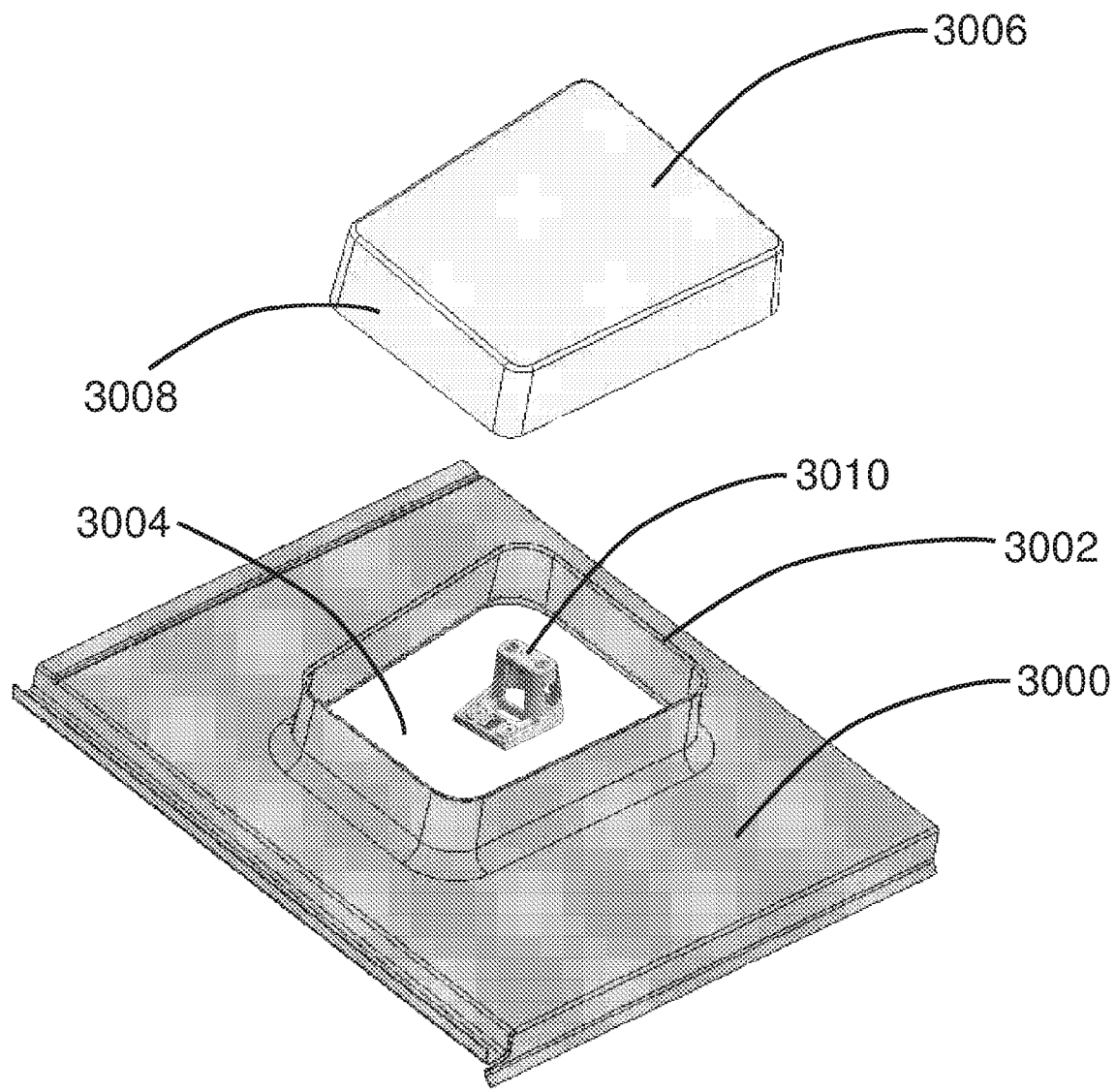
FIG. 39 shows a perspective view of another example of a replacement tile with a tile mount, according to the present invention.

FIG. 39 shows a perspective view of another example of a replacement tile with a tile mount, according to the present invention. Replacement tile 3000 is a flat tile (which can also be S-shaped or W-shaped) with a central aperture 3004 that is defined by an upstanding/protruding sleeve (plateau, mesa, rim) 3002, which can be rectangularly shaped. Alternatively, aperture 3004 can have a circular, oval, square, pentagonal, or other shape. Disposed inside of aperture 3004 is tile mount 3010 attached to a roof (at the location of a underlying rafter). Cap 3006 with four continuous side walls 3008 slips over raised sleeve 3002 and, thus, covers the opening/aperture 3004 in tile 3000. Cap 3006 can be a relatively thin membrane, made of an elastomeric polymer membrane, such as EDPM or TPO. Membrane cap 3006 can be a fiber-reinforced membrane material. Alternatively, cap 3006 can be made of a soft aluminum sheet.

The foregoing disclosure has been set forth merely to illustrate the invention and is not intended to be limiting. Since modifications of the disclosed embodiments incorporating the spirit and scope of the invention may occur to persons skilled in the art, the invention should be construed to include everything within the scope of the appended claims and equivalents thereof.

What is claimed is:

1. A method of installing a replacement tile on top of a tile mount for mounting solar panels to a roof, the method comprising:
   positioning the replacement tile on a monolithic riser of the tile mount, such that a flat platform of the replacement tile is disposed on top of a flat platform of the monolithic riser, wherein the flat platform of the replacement tile includes an aperture-less top portion formed of a polymeric membrane;
   elastically deforming the flat platform of the replacement tile with a finger of an installer;
   identifying, via the elastic deformation and the finger of the installer, a location of a mounting hole disposed in the flat platform of the monolithic riser; and
   penetrating the polymeric membrane at the location.

2. The method of claim 1, further comprising positioning a deformable washer on top of the flat platform of the replacement tile and at the location of the mounting hole.

3. The method of claim 1, further comprising positioning a bar on top of the flat platform of the replacement tile and at the location of the mounting hole.

4. The method of claim 3, further comprising attaching a height-adjustable mounting assembly to the bar for mounting the solar panels to the roof.

5. The method of claim 4, further comprising displacing a lower bracket of the height-adjustable mounting assembly up or down relative to the bar via a helical drive of the height-adjustable mounting assembly.

6. The method of claim 1, further comprising positioning a bracket on top of the flat platform of the replacement tile and at the location of the mounting hole.

7. The method of claim 6, further comprising attaching a structural rail to the bracket for mounting the solar panels to the roof.

8. The method of claim 1, wherein the polymeric membrane comprises an over-molded polymeric membrane.

9. A method of installing a replacement tile on top of a tile mount for mounting solar panels to a roof, the method comprising:
   positioning the replacement tile on a monolithic riser of the tile mount, such that a flat platform of the monolithic riser is disposed below and in contact with a flat platform of the replacement tile, wherein the flat platform of the replacement tile includes an aperture-less top portion formed of a polymeric membrane;
   elastically deforming the flat platform of the replacement tile with a finger of an installer;
   identifying, via the elastic deformation and the finger of the installer, a location of a mounting hole disposed in the flat platform of the monolithic riser; and
   penetrating the polymeric membrane at the location.

10. The method of claim 9, wherein the location is a first location of a first mounting hole disposed in the flat platform of the monolithic riser, and the method further comprising:
locating a second location of a second mounting hole disposed in the flat platform of the monolithic riser; and
penetrating the polymeric membrane at the second location.

11. The method of claim 9, further comprising:
positioning a first deformable washer on top of the flat platform of the replacement tile and at the first location of the first mounting hole; and
positioning a second deformable washer on top of the flat platform of the replacement tile and at the second mounting hole.

12. The method of claim 11, further comprising:
positioning a bar on top of each of the first deformable washer and the second deformable washer;
attaching a first portion of the bar, via a first fastener, to the first mounting hole disposed in the flat platform of the monolithic riser; and
attaching a second portion of the bar, via a second fastener, to the second mounting hole disposed in the flat platform of the monolithic riser.

13. The method of claim 12, further comprising attaching a height-adjustable mounting assembly to the bar for mounting the solar panels to the roof.

14. The method of claim 9, further comprising positioning a deformable washer on top of the flat platform of the replacement tile and at the location of the mounting hole.

15. The method of claim 14, further comprising:
positioning an L-shaped bracket on top of the deformable washer; and
attaching the L-shaped bracket, via a fastener, to the mounting hole disposed in the flat platform of the monolithic riser.

16. The method of claim 15, further comprising attaching a structural rail to the L-shaped bracket for mounting the solar panels to the roof.

17. A method of installing a replacement tile on top of a tile mount for mounting solar panels to a roof, the method comprising:
positioning the replacement tile around a monolithic riser of the tile mount, such that the monolithic riser is disposed inside of a central aperture of the replacement tile, the central aperture having a raised sleeve for receiving a cap covering the central aperture;
positioning the cap on the raised sleeve, such that a flat platform of the cap is disposed on top of a flat platform of the monolithic riser, wherein the flat platform of the cap includes an aperture-less top portion formed of a polymeric membrane;
elastically deforming the flat platform of the cap with a finger of an installer;
identifying, via the elastic deformation and the finger of the installer, a location of a mounting hole disposed in the flat platform of the monolithic riser; and
penetrating the polymeric membrane at the location.

18. The method of claim 17, further comprising positioning a deformable washer on top of the flat platform of the cap and at the location of the mounting hole.

19. The method of claim 18, further comprising:
positioning a bar on top of the deformable washer; and
attaching the bar, via a fastener, to the mounting hole disposed in the flat platform.

20. The method of claim 18, further comprising:
positioning a bracket on top of the deformable washer; and
attaching the bracket, via a fastener, to the mounting hole disposed in the flat platform.

* * * * *